United States Patent
James et al.

(10) Patent No.: US 12,521,613 B1
(45) Date of Patent: Jan. 13, 2026

(54) GOLF BALL HOLDER

(71) Applicant: Acushnet Company, Fairhaven, MA (US)

(72) Inventors: Jedediah H James, Dighton, MA (US); Michael McNamara, Fairhaven, MA (US); Edmund T. Maher, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 214 days.

(21) Appl. No.: 18/398,387

(22) Filed: Dec. 28, 2023

Related U.S. Application Data

(63) Continuation-in-part of application No. 17/552,646, filed on Dec. 16, 2021, now Pat. No. 12,011,939.

(51) Int. Cl.
*A63B 57/20* (2015.01)
*B41J 3/407* (2006.01)
*B65G 35/06* (2006.01)
*B65G 54/02* (2006.01)

(52) U.S. Cl.
CPC .......... *A63B 57/20* (2015.10); *B41J 3/40731* (2020.08); *B65G 35/06* (2013.01); *B65G 54/02* (2013.01)

(58) Field of Classification Search
CPC ...... B41J 3/40731; A63B 57/20; B65G 35/06; B65G 54/02
USPC .................. 198/867.01–867.9, 803.01–803.9
See application file for complete search history.

(56) References Cited

U.S. PATENT DOCUMENTS

| | | | | |
|---|---|---|---|---|
| 6,462,812 | B1 * | 10/2002 | Heene | A63B 45/02 |
| | | | | 382/141 |
| 7,992,851 | B2 * | 8/2011 | Vieira | B41F 17/30 |
| | | | | 248/349.1 |
| 10,328,718 | B2 * | 6/2019 | Condello | B41M 1/40 |
| 12,011,939 | B2 * | 6/2024 | Maher | B65G 35/06 |
| 2002/0097280 | A1 * | 7/2002 | Loper | B41J 3/40731 |
| | | | | 347/2 |
| 2003/0059551 | A1 * | 3/2003 | Skrabski | A63B 37/12 |
| | | | | 427/261 |
| 2010/0182368 | A1 * | 7/2010 | Matsui | B41J 11/02 |
| | | | | 206/563 |
| 2010/0186610 | A1 * | 7/2010 | Polk | B41J 3/4073 |
| | | | | 101/35 |
| 2017/0056918 | A1 * | 3/2017 | Allen | B41J 3/4073 |

FOREIGN PATENT DOCUMENTS

| | | | | |
|---|---|---|---|---|
| KR | 20190002940 U | * | 11/2019 | .......... B41J 2/04501 |
| TW | M365348 | * | 9/2009 | .............. B65G 25/04 |

* cited by examiner

*Primary Examiner* — James R Bidwell
(74) *Attorney, Agent, or Firm* — Steven Landolfi, Jr.

(57) ABSTRACT

A golf ball holder for mounting to a shuttle has a holding clamp configured to receive a golf ball and maintain an orientation of the golf ball. The golf ball holder also has a sliding plate having a top surface and a bottom surface and a slot, a mounting plate having a top surface and a bottom surface and a pin through hole, a mount having a top surface and a bottom surface and an attachment hole, and a mounting pin. The golf ball holder is configured to be arranged with the holding clamp, sliding plate, mounting plate, and mount stacked in a direction parallel to an axis with the mounting pin extending in the direction parallel to the axis and positioned in the slot, the pin through hole, and the attachment hole.

17 Claims, 21 Drawing Sheets

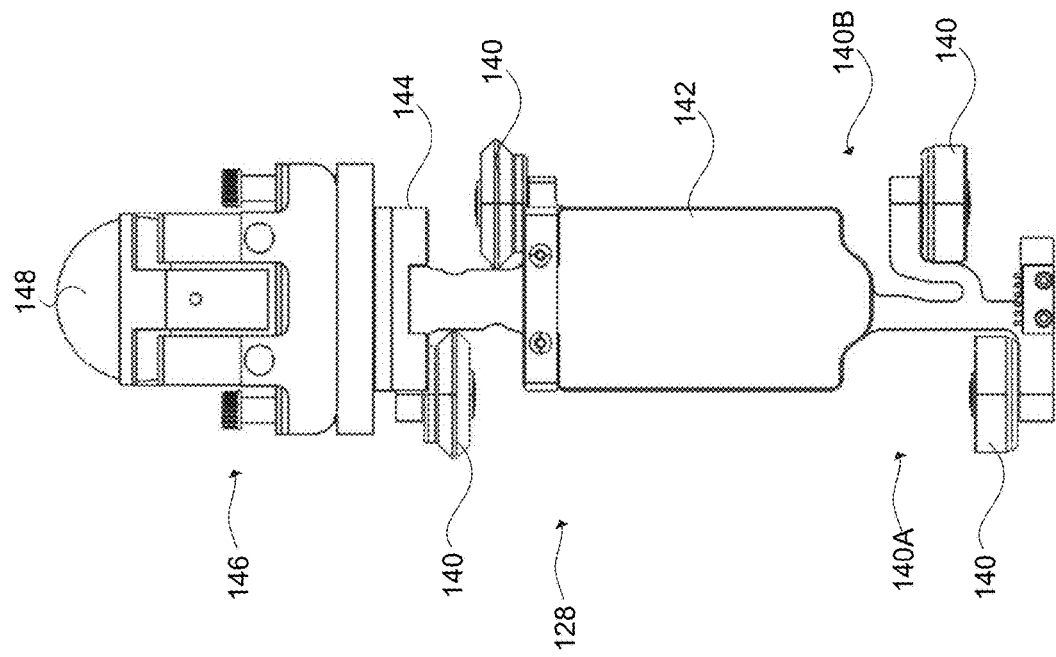
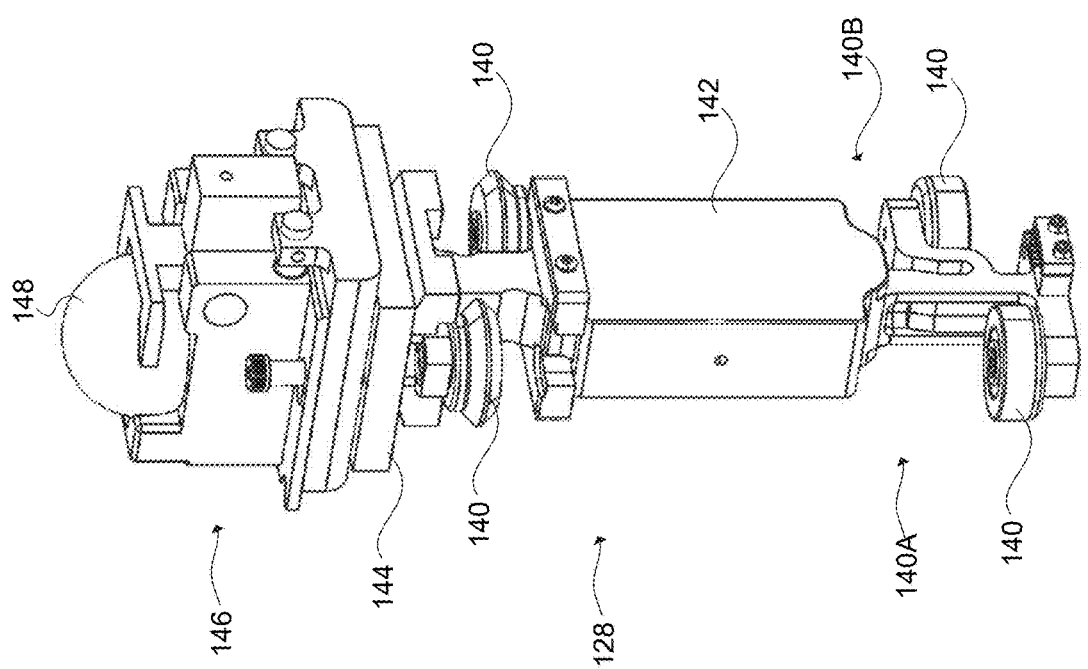

GOLF BALL HOLDER

CROSS REFERENCE TO RELATED APPLICATIONS

The present application is a continuation-in-part of U.S. patent application Ser. No. 17/552,646, filed Dec. 16, 2021, the entire disclosure of which is hereby incorporated herein by reference.

FIELD OF THE INVENTION

This invention generally relates to a manufacturing and processing system for golf balls, and more particularly to a golf ball holder for positioning a golf ball in a transportation system.

BACKGROUND OF THE INVENTION

The manufacture of golf balls typically involves a series of sequential processes performed at different processing stations, typically spatially separated one from another. These different processing stations may require manual movement of the golf balls between different stations. For example, golf balls may need to be manually moved from a processing station to a printing area and hand-fed into a printing line. Conventional automation tools have limited applicability to golf balls, because of the wide variety of markings that are printed on golf balls, often in small quantities. Different individual printing stations may require individual preparation, planning, and turnover to produce golf balls with different printed markings, such as custom logos or other indicia. The disclosed embodiments provide automation tools for improving the processing speed and efficiency of manufacturing golf balls, especially the process of printing markings on golf balls.

SUMMARY OF THE INVENTION

In some embodiments, the present disclosure includes a golf ball holder. The golf ball holder is configured to be attached to a shuttle that is configured to be attached to a track for movement of the golf ball holder along the track. The golf ball holder includes a holding clamp configured to receive the golf ball and maintain an orientation of the golf ball. The golf ball holder also includes a sliding plate including a top surface and a bottom surface and a slot. The golf ball holder further includes a mounting plate including a top surface and a bottom surface and a pin through hole. The golf ball holder also includes a mount including a top surface and a bottom surface and an attachment hole, wherein the bottom surface is configured to be mounted to the shuttle. The golf ball holder further includes a mounting pin. The golf ball holder is configured to be arranged with the holding clamp, sliding plate, mounting plate, and mount stacked in a direction parallel to an axis with the mounting pin extending in the direction parallel to the axis and positioned in the slot, the pin through hole, and the attachment hole.

In some embodiments, the present disclosure includes a golf ball holder. The golf ball holder is configured to be attached to a shuttle that is configured to be attached to a track for movement of the golf ball holder along the track, wherein the shuttle comprises a lubricated bearing. The golf ball holder includes a holding clamp configured to receive the golf ball and maintain an orientation of the golf ball and including a first service through hole. The golf ball holder also includes a sliding plate including a top surface, a bottom surface, and a second service through hole. The golf ball holder also includes a mounting plate including a top surface, a bottom surface, and a third service through hole. The golf ball holder further includes a mount including a top surface, a bottom surface, and a fourth service through hole, wherein the bottom surface is configured to be mounted to the shuttle. The golf ball holder additionally includes a mounting pin connecting the holding clamp, the sliding plate, the mounting plate, and the mount. The golf ball holder is configured to be arranged with the holding clamp, sliding plate, mounting plate, and mount stacked in a direction parallel to an axis with the first, second, third, and fourth service through holes aligned to create a service pathway that extends in the direction parallel to the axis.

BRIEF DESCRIPTION OF THE DRAWINGS

FIG. 5 is a perspective view of an exemplary shuttle configured to carry a golf ball through the transportation system of FIG. 1A, consistent with disclosed embodiments;

FIG. 6 is a front view of the shuttle of FIG. 5, consistent with disclosed embodiments;

DETAILED DESCRIPTION OF THE INVENTION

According to disclosed embodiments, a high-speed golf ball handling and management system is disclosed for golf ball manufacturing, and, more particularly, golf ball orientation, printing, offloading, and packaging. The disclosed embodiments include a transportation system for moving a plurality of golf balls through one or more processing stations via an interconnected track system. A control system is connected with the track system and various stations to control the movement of golf-ball-transporting shuttles within the handling and management system. The shuttles may be configured to switch between the plurality of tracks based on instructions from the control system. The golf ball handling and management system includes at least one processing station, such as a printing station, that performs a manufacturing or processing task related to the golf ball.

In at least some embodiments, the control system is configured to manage a plurality of simultaneous tasks within the handling and management system. For example, the control system may be configured to control a first shuttle to arrive at a first processing station for a first processing task while simultaneously controlling a second shuttle to arrive at a second processing station for a second task. In an exemplary embodiment, the control system is configured to generate a processing plan for a golf ball and/or lot of golf balls received at an onboarding station and thereafter control the movement of multiple shuttles simultaneously to increase the throughput of the system. For example, the control system may simultaneously control different printing processes for different golf ball lots and deliver the golf balls to a packaging station for grouping and packaging of similar lots.

Further embodiments may include particularized tools and equipment for processing golf balls using the disclosed transportation system. For example, some embodiments include a golf ball holder configured to mount to a shuttle that is transported by the disclosed transportation system. The holder may include features to hold and maintain a golf ball in a desired orientation on a shuttle such that when the shuttle is delivered to a processing station, the golf ball can be processed with precision and reliability. For example, the holder may be configured to orient a golf ball to expose a portion of the golf ball for printing on the golf ball. The holder may further include features for interacting with a processing station, such as a printing station. Similarly, the processing station may include particularized features for interacting with the holder and/or shuttle.

Figure 1A:
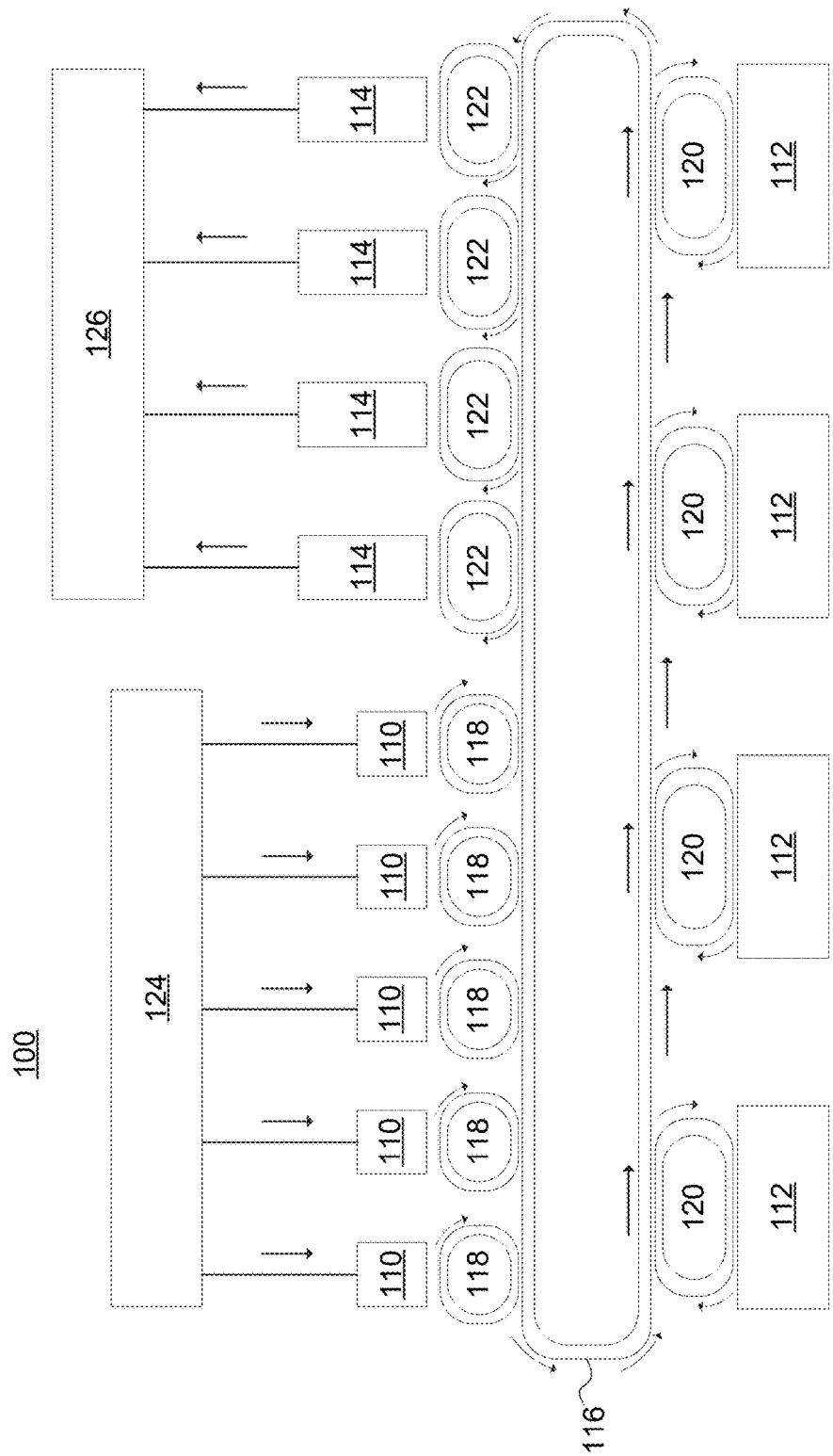
FIG. 1A is a diagram of an exemplary golf ball transportation system, consistent with disclosed embodiments.

FIG. 1A is a diagram of a golf ball transportation system 100. The system 100 is configured to transport a plurality of golf balls between a plurality of processing and/or manufacturing stations 110, 112, and 114. The plurality of stations 110, 112, and 114 are connected by primary track 116 and a plurality of station tracks 118, 120, and 122. In an exemplary embodiment, each station track 118, 120, and 122 is associated with a station 110, 112, or 114. The primary track 116 connects each of the station tracks 118, 120, 122 to each other. Each of the primary track 116 and station tracks 118, 120, 122 may be a continuous loop, but are not limited thereto. It should be understood that, as shown in the drawing, each station 110, 112, 114 may be a station grouping of a plurality of stations. For example, the stations 110 may be a group of orienting stations for each onboarding and orienting a golf ball in the system 100. The use of multiple stations in a group may add to the output and efficiency of the system 100. Similarly, each station track 118, 120, 122 may be a station track grouping of a plurality of station tracks as shown. Further, it should be understood that the illustrated configuration is merely one example and that other embodiments may include a different configuration of stations and tracks.

In an exemplary embodiment, the system 100 is configured to receive a plurality of golf balls from a golf ball delivery system 124, transport the plurality of golf balls between stations 110, 112, and 114, and output the processed golf balls though a golf ball output system 126. Within the system 100, the golf balls may move between stations 110, 112, and 114 via connections from the primary track 116. For example, a golf ball may be input at the golf ball delivery system 124, placed onto station track 118 via the station 110, transfer to the primary track 116 where it is delivered to station track 120 for processing at station 112, and transferred back to the primary track 116 before it is delivered to station track 122 for removal via station 114. In some embodiments, the golf ball is transferred to multiple stations 112 before transfer to a station track 122.

As shown in FIG. 1A, the station tracks 118, 120, and 122 have a loop configuration such that a golf ball can be transferred to the track, processed at corresponding station equipment, and looped back onto the primary track 116. Further, the station tracks 118, 120, and 122 to not physically contact the primary track 116. The transportation system 100 may be configured with equipment for inducing motion to the golf balls. The equipment may include, for example, a stator motor system such as a linear track system produced by B&R Industrial Automation GmbH and/or as described in any of U.S. Pat. Nos. 10,118,775, 10,532,891, 10,913,362, and 11,161,700, which are hereby incorporated by reference in their entirety. Other similar transportation systems may also be applicable for high-speed transportation of golf balls on a plurality of tracks.

Figure 1B:
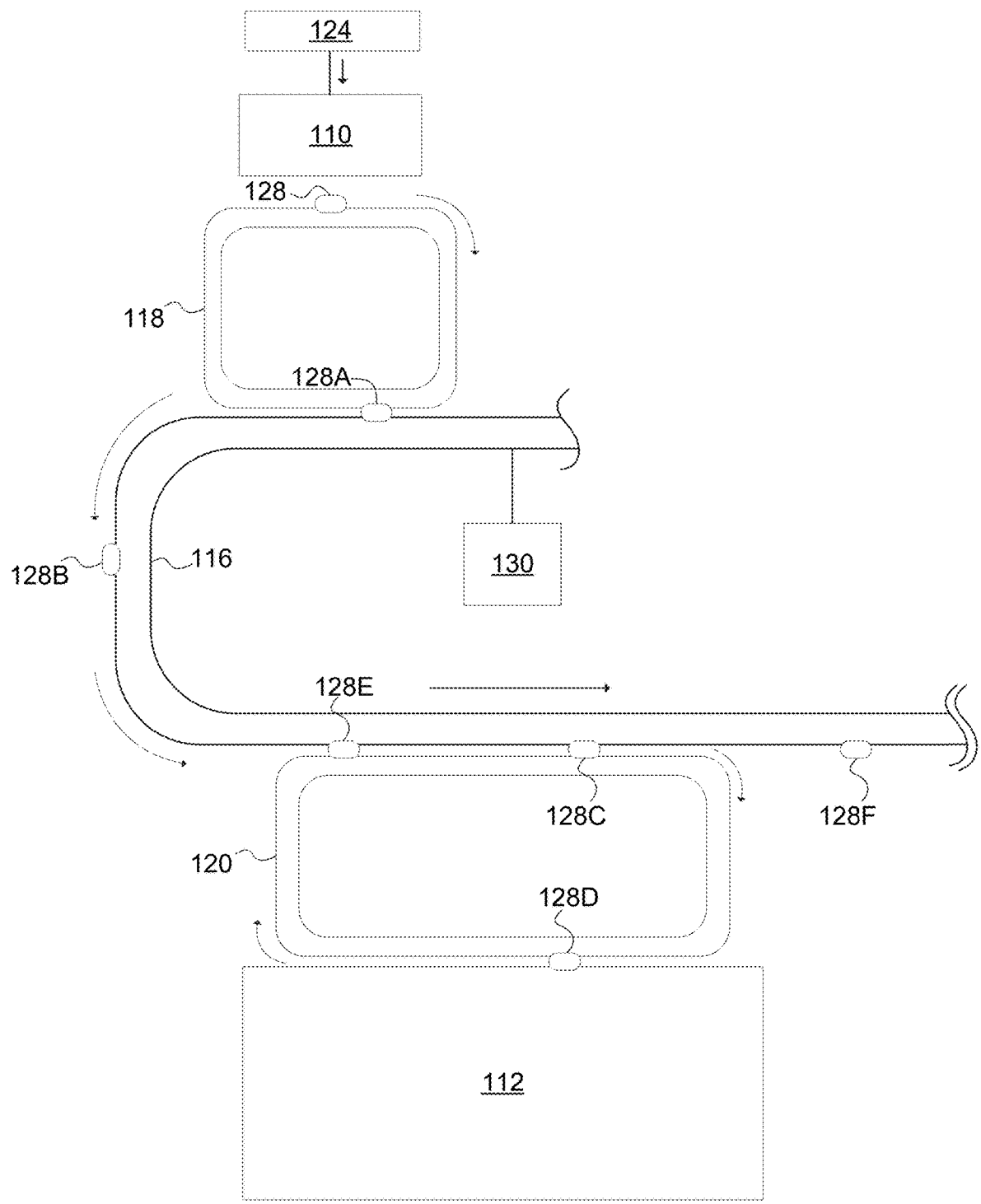
FIG. 1B is another diagram of a portion of the golf ball transportation system of FIG. 1A, further depicting movement of golf ball shuttles through the system, consistent with disclosed embodiments.

FIG. 1B further illustrates a selected portion of the system 100, including the station 110 and station 112 connected by a portion of the primary track 116 and station tracks 118 and 120. In an exemplary embodiment, the system 100 further includes at least one shuttle 128. Each shuttle 128 is configured to move along the primary track 116 and each of the station tracks 118, 120, and 122. Each shuttle 128 is configured to carry at least one golf ball thereon. An exemplary embodiments of the shuttle 128 is shown and described in relation to FIGS. 5 and 6. In some embodiments, the station 110 is configured to place and orient a golf ball on a shuttle 128. In some embodiments, a control system 130 is configured to use software and power controls to selectively move the shuttle 128 (and the golf ball(s) carried thereon) throughout the system 100. The control system 130 may be, for example, a computing device having at least a processing unit and a memory storing instructions for the processing unit to execute to complete one or more processes. The control system 130 may be configured to send signals to components of the system 100 to control movement of the shuttles 128 in the system. As described, the primary track 116 does not physically contact any of the station tracks 118, 120, 122. This enables high-speed track switching by the shuttles 128, which have multiple bearing surfaces for riding on the different tracks in the system.

FIG. 1B further depicts exemplary movement of the shuttle 128 through the system 100. The shuttle 128 may start adjacent to the station 110, which may be an onboarding and/or orienting station. The station 110 may include equipment for placing a golf ball on the shuttle 128. For example, the station 110 may place the golf ball on the shuttle 128 in a selected orientation. The shuttle 128 moves around the station track 118 to the position shown at 128A, where the shuttle 128 is transferred from the station track 118 to the primary track 116. The shuttle continues along the primary track to the position shown at 128B and eventually to the position at 128C where it is transferred to the station track 120. The shuttle 128 moves around the station track 120 and is positioned at 128D for processing at the station 112 (e.g., pad printing). The shuttle 128 continues along the loop of the station track 120 until it is transferred back to the primary track 116 at the position shown at 128E. The shuttle 128 continues along the primary track 116 to the position at 128F and continues on to another processing station and/or for eventual removal of the golf ball from the system 100 by an offloading station. As shown, the positions at 128A, 128C, and 128E are transfer positions in which the shuttle 128 comes into proximity with the primary track 116 and one of the station tracks 118, 120, 122, even though the tracks do not physically contact each other. The system 100 is thus configured to enable the shuttles 128 to perform high-speed and seamless switching between tracks according to instructions from the control system 130.

In an exemplary embodiment, the system 100 is an automated system for printing markings on a golf ball. In an exemplary embodiment, the station 110 is an orienting station configured to onboard and position a golf ball in a particular orientation on a shuttle 128. Each station 112 may be a printing station configured to print a marking on the golf ball carried by the shuttle 128. Each station 114 may be an offloading station configured to receive a golf ball after it has been stamped and deliver the golf ball for further processing (e.g., packaging). The golf ball delivery system 124 may be configured to deliver a plurality of golf balls to the orienting stations 110 and the offloading stations 114 may be configured to deliver the printed golf balls to the golf ball output system 126 for packaging or other processing steps. The control system 130 may be configured for high speed movement of a plurality of golf balls throughout the system 100 simultaneously. The control system 130 may be programmed with anti-collision software to ensure that a plurality of shuttles 128 can move through the system 100 smoothly and without collisions or interruptions. As a result, the system 100 is configured as a high-speed, high-throughput system for printing markings on golf balls prior to packaging and/or delivery of a final product. For example, the system 100 may achieve a processing speed of 300 balls per minute (300 printed golf balls being offloaded every minute). It should be understood, however, that printing is one example of a processing step that may be accomplished using the system 100. The system 100 may be modified and/or adapted to accomplish other golf ball and/or golf equipment processing steps in a high-speed and high-precision production line.

Figure 2:
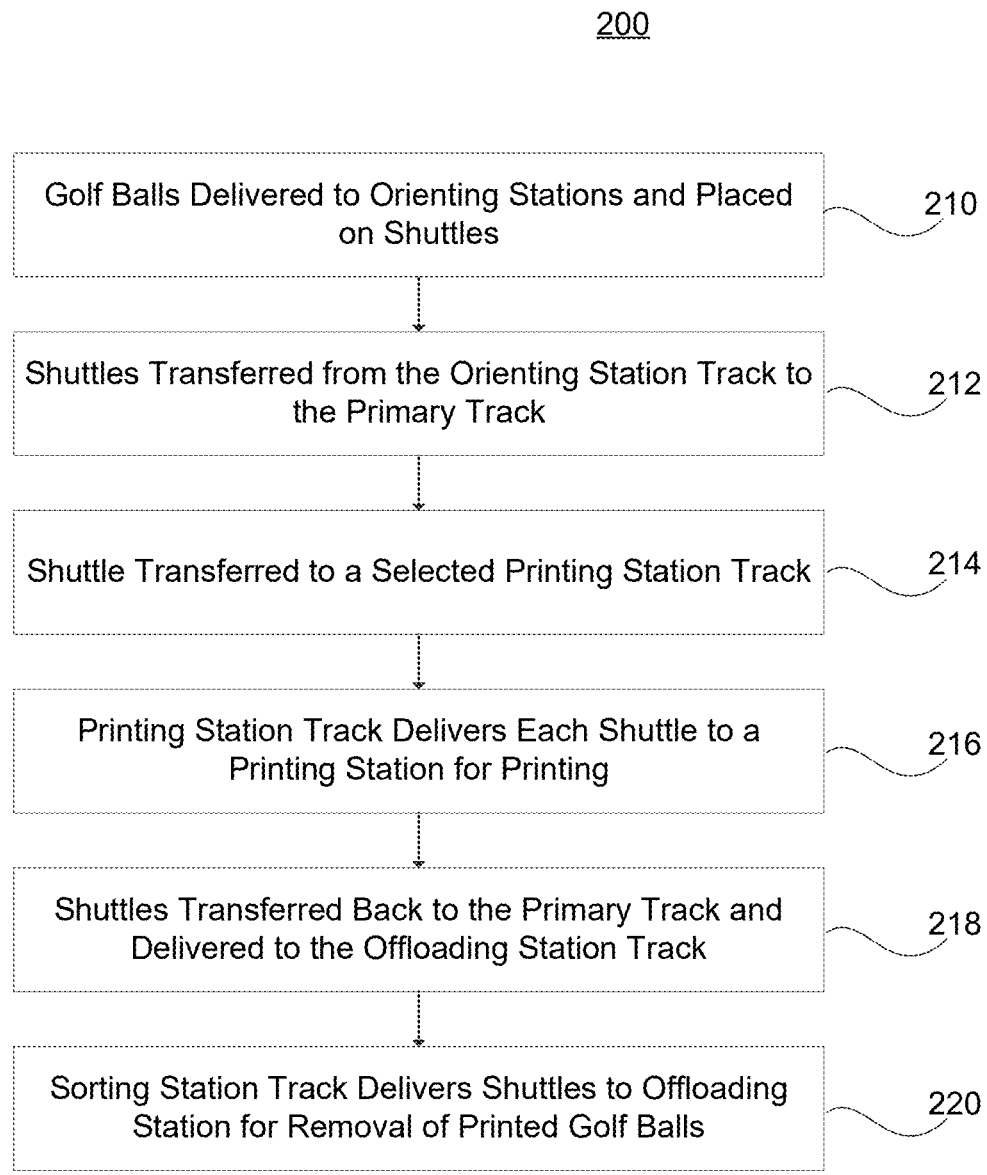
FIG. 2 is a flowchart of an exemplary process for processing a golf ball using the transportation system of FIG. 1A.

FIG. 2 is a flowchart of an exemplary golf ball manufacturing process 200. The process 200 may be performed by one or more components of the system 100, such as via control system 130 executing software instructions to move golf balls on shuttles 128. In step 210, a plurality of golf balls are delivered to orienting stations 110 by the golf ball delivery system 124. The orienting stations 110 may be configured to individually place a golf ball onto a shuttle 128 in a desired orientation. The desired orientation may be a positioning of the golf ball such that printing will occur at a selected location on the golf ball. The orienting station 110 may, for example, inspect a golf ball for a dimple pattern or other distinguishing characteristic (e.g., existing printed markings such as logos, side stamps, alignment markings, etc.) in order to orient the golf ball. In an exemplary embodiment, the golf ball delivery system 124 may be a complex sorting system configured to deliver different types of golf balls to the system 100 and may provide processing orders to the control system 130 for controlling the golf balls through the system 100 and applying the appropriate steps (e.g., printing a desired marking on a particular ball and further sorting that golf ball to a desired destination).

In step 212, the shuttle 128 is moved along the station track 118 and transferred to the primary track 116. For example, the shuttle 128 may be configured to ride along a side of the station track 118 and switch to the primary track 116 via electromagnetic force attracting the opposite side of the shuttle 128 to the side of the primary track 116. The control system 130 may be configured to continuously store a location of the shuttle 128 and move the shuttle 128 along the primary track 116 to a next destination according to a desired manufacturing process.

Figure 4:
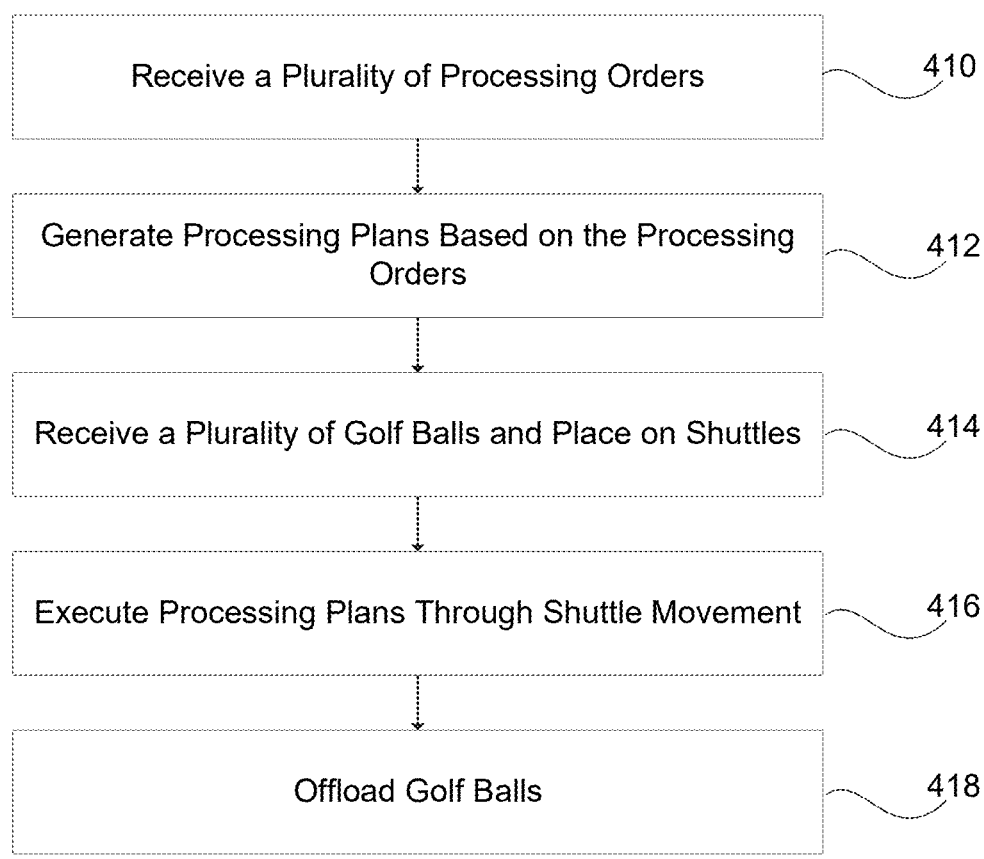
FIG. 4 is a flowchart of an exemplary process for simultaneously processing a plurality of golf balls using the transportation system of FIG. 1A.
Figure 8:
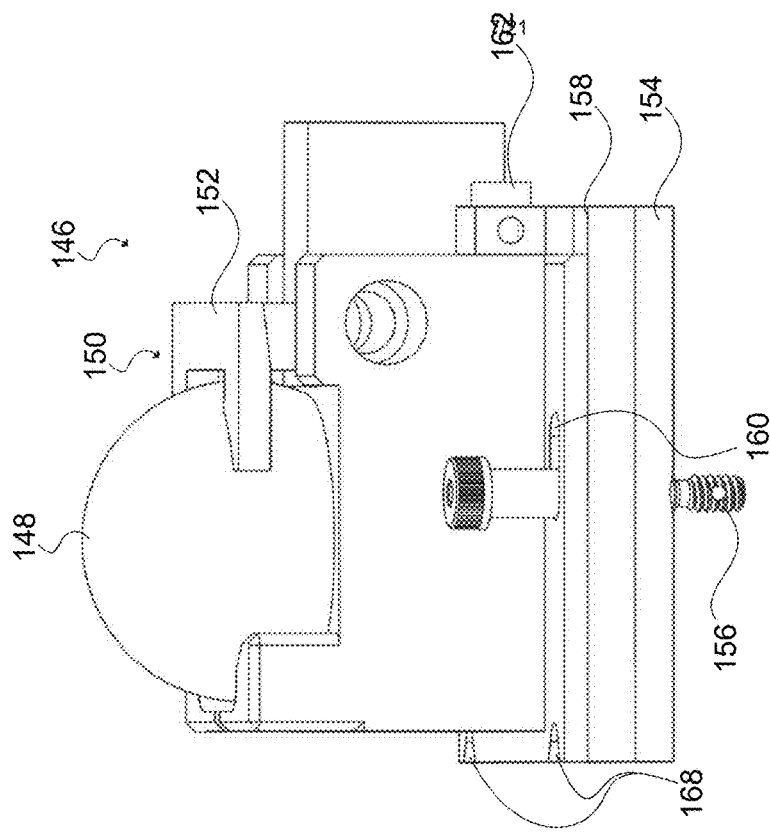
FIG. 8 is another perspective view of the golf ball holder of FIG. 7, consistent with disclosed embodiments.
Figure 7:
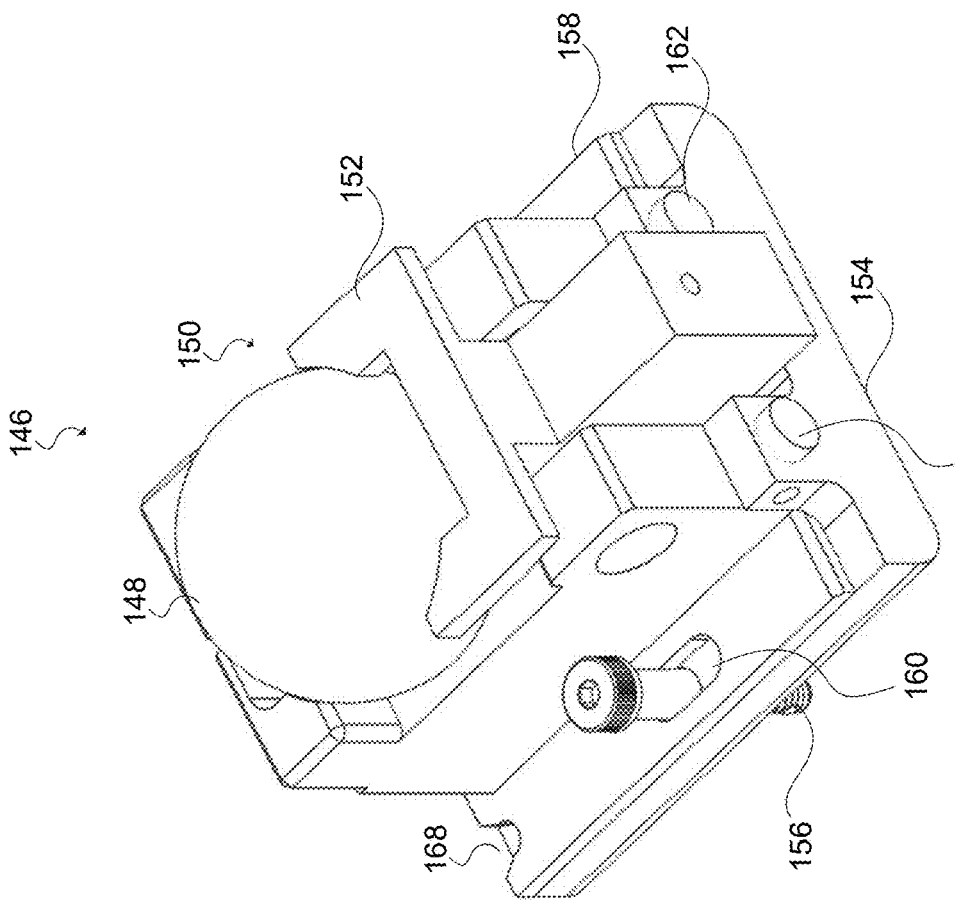
FIG. 7 is a perspective view of a golf ball holder for positioning a golf ball on a shuttle, including a lock mechanism in an open position, consistent with disclosed embodiments.
Figure 10:
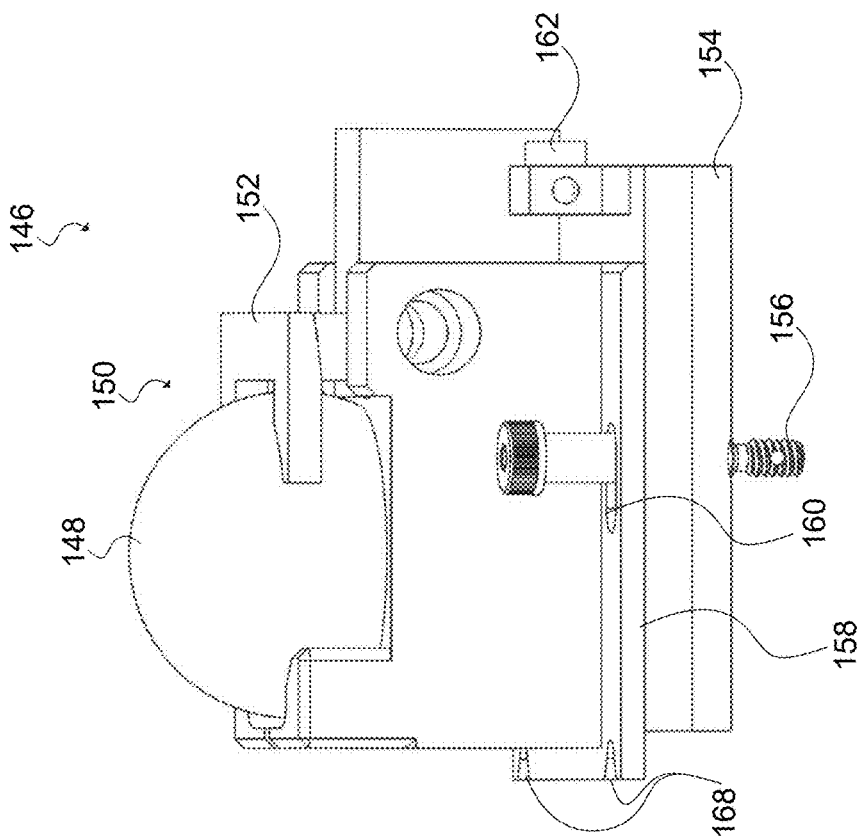
FIG. 10 is another perspective view of the golf ball holder of FIG. 7 in the locked position, consistent with disclosed embodiments.
Figure 9:
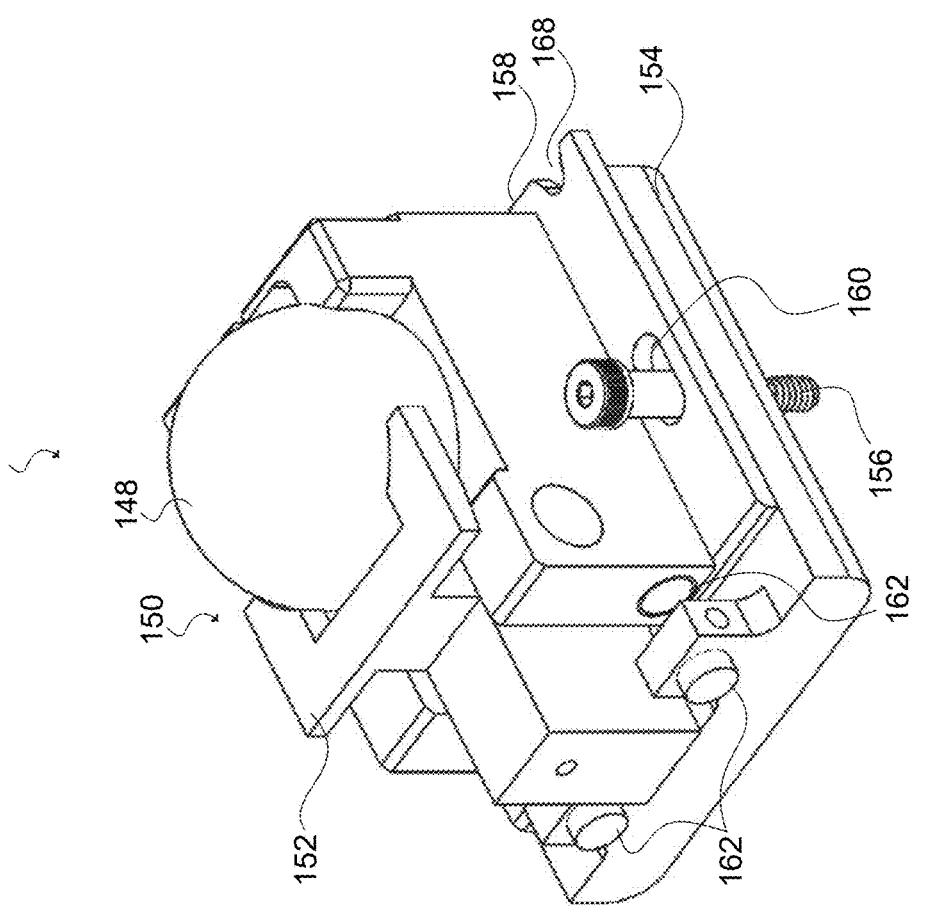
FIG. 9 is another perspective view of the golf ball holder of FIG. 7, including the lock mechanism in a locked position, consistent with disclosed embodiments.

In step 214, the control system 130 instructs the system 100 to transfer the shuttle 128 to the station track 120. In step 216, the station track 120 delivers the shuttle 128 to the printing station 112 for printing on the oriented golf ball. The printing station 112 is not limited to any particular printing process and can include multiple steps for printing. For example, the printing station 112 may be configured with multiple printing and orienting steps for complex printing on the golf ball. FIG. 4 depicts an exemplary embodiment of a printing station 112 and a station track 120. A plurality of shuttles 128 are configured to move along a side of the station track 120 to deliver a plurality of golf balls 132. The printing station 112 includes a printing apparatus 134, such as a plurality of printing pads configured to stamp markings on a golf balls 132. The system 100 may be configured such that the golf balls 132 are stopped in position under the printing apparatus 134 for printing before continuing along the station track 120. The printing station 112 may include, in some embodiments, an inspection station 136 for inspecting a printed marking and a removal device 138 (e.g., kickout) for selectively removing any golf balls that do not pass a visual inspection test. In some embodiments, the printing station 112 may further include a curing apparatus for drying the printed ink.

Figure 3:
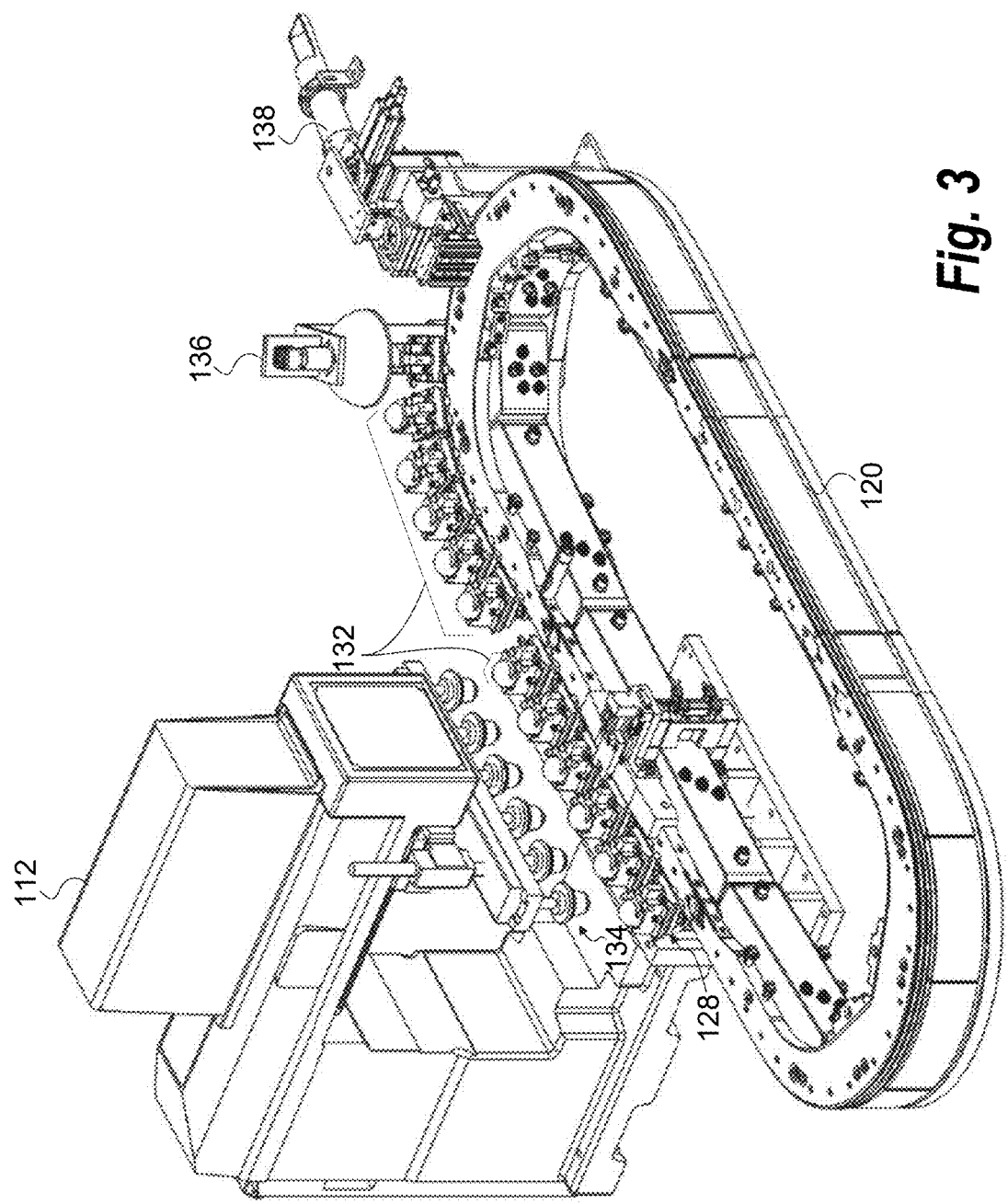
FIG. 3 is a perspective view of an exemplary printing station and associated station track, consistent with disclosed embodiments.

Returning to FIG. 3, in step 218, the shuttle 128 is returned to the primary track 116 and delivered to the offloading station 114 via the station track 122. For example, after the printing steps are completed via one or more printing stations 112, the golf ball may be satisfactory for offloading and/or packaging. In step 220, the offloading station 114 may remove a printed golf ball from the system 100. For example, the offloading station 114 may place a printed golf ball in a particular packaging system or location based on instructions from the control system 130.

The process 200 is an example method for processing a golf ball such that a particular type of golf ball is selected, delivered to a printing station in a desired orientation, printed according to desired specifications, and delivered to a target destination for packaging or further processing. The system 100 is configured such that this process may be continuously repeated and run simultaneously with many golf balls, even if the golf balls have different processing plans (e.g., different printing). As a result, a high-speed, high-throughput golf ball printing line may be realized.

FIG. 4 is a flowchart of an exemplary process 400 for processing multiple golf balls simultaneously in the system 100. In an exemplary embodiment, the control system 130 may be configured to provide instructions to one or more components of the system 100 to perform the steps of the process 400. For example, the control system 130 may be connected to one or more motors, controllers, switches, power sources, and the like, to control the movement of the plurality of shuttles 128 within the system 100.

In step 410, the control system 130 may receive a plurality of processing orders. Each processing order may include instructions for performing a manufacturing task on at least one golf ball. For example, a first processing order may include instructions for printing a first marking on one dozen golf balls. Another example may include a processing order for printing a second marking on another dozen golf balls. The processing order may include information identifying the station and/or stations 112 within the system 100 to perform the manufacturing task (e.g., which station or stations is prepared to print a desired marking).

In step 420, the control system 130 may generate processing plans based on the processing orders. For example, the control system 130 may convert the processing plans into concrete instructions for accomplishing the desired manufacturing task. In one example, the control system 130 may select a station 110 to identify and place the golf ball on a shuttle 128. The control system 130 may also select at least one station 112 to complete at least one processing step (e.g., printing, orienting, curing, painting, etc.). In some embodiments, the control system 130 may select multiple stations 112 to perform processing steps (e.g., printing at two different printing stations). The control system 130 may also select a station 114 to offload the golf ball.

In step 430, the system 100 may receive a plurality of golf balls from the golf ball delivery system 124. In some embodiments, the control system 130 may control the golf ball delivery system 124 to deliver a particular type of golf ball to a selected one of the stations 110. In step 440, the control system 130 is configured to control the system 100 to execute the processing plans on the onboarded golf balls through movement of the shuttles 128. In step 450, the finished golf balls are offloaded form the system 100 based on instructions from the control system 130.

According to some embodiments, the disclosed system 100 is applicable to quickly and efficiently process a plurality of golf balls simultaneously. The control system 130 is configured to generate processing plans and orchestrate timing of the movement of multiple shuttles 128 such that golf balls associated with different manufacturing tasks may be intermixed without losing track of processing orders. For example, a first, third, fifth, etc. golf ball through the system 100 may be oriented at a first station 110, printed at a first station 112, and offloaded a first station 114. A second, fourth, sixth, etc., golf ball through the system may be oriented at a second station 110, printed at a second station 112, and offloaded at a second station 114. The throughput/capacity of the system 100 can thus be customized based on the number of stations and tracks placed into the system and the complexity of the manufacturing tasks to be completed.

In another example, a golf ball of a first type may be delivered to a printing station for printing of a first marking while a golf ball of a second type may be delivered to the same or a different printing station for printing of a different second marking. The differently-printed golf balls may be delivered to different offloading stations and/or sorted into different packaging locations for packaging of similar golf balls. For example, one golf ball may receive a single printing stamp at one printing station, a second golf ball may receive multiple printing stamps at the same printing station, and another golf ball may receive multiple printing stamps at different printing stations within the transportation system. In this way, multiple different golf ball lots with different parameters may be processed simultaneously without collision or interruptions. The control system 130 may associate processing steps with a particular shuttle and provide instructions to track that shuttle throughout the transportation system for accurate final delivery and/or packaging.

The disclosed embodiments further include equipment, tools, adapters, etc. configured to enable the shuttles 128 to particularly carry a golf ball and, further, for the motion components to interact with the processing stations, such as a printing station.

FIGS. 5 and 6 include a perspective and side view of an exemplary shuttle 128 that may be used in conjunction with the transportation system 100 described herein. The shuttle 128 may include bearings 140 configured to enable movement of the shuttle 128 on the side of the primary track 116. The shuttle 128 may particularly include bearings 140 on two sides of a stanchion 142 to enable transfer of the shuttle 128 from one track to another (e.g., the shuttle 128 may ride on one side of a track and transfer to an adjacent track that comes in proximity to an opposite side of the shuttle). For example, the shuttle 128 may include a first side bearing 140A and a second side bearing 140B on opposing sides. The first side bearing 140A may be configured to ride the primary track 116 and the second side bearing 140B may be configured to ride on the plurality of station tracks 118, 120, 122. In this way, each shuttle 128 may be configured to switch between the primary track 116 and the station tracks 118, 120, 122 at high speeds even though the primary track is physically spaced from the station tracks 118, 120, 122. As the shuttle 128 arrives at positions in which the shuttle 128 is in proximity to both the primary track 116 and a respective one of the station tracks 118, 120, 122, the control system 130 can use a force (e.g., electromagnetic switch) to transfer the shuttle between the tracks. The shuttle 128 may further include a mount 144 attached to the stanchion 142 and configured to support a golf ball holder 146. The golf ball holder 146 is configured to receive and hold a golf ball 148 on the shuttle 128 such that the golf ball 148 can be moved through the transportation system 100.

FIGS. 7-10 further illustrate an exemplary embodiment of the golf ball holder 146. The golf ball holder 146 includes a holding clamp 150 for receiving and holding the golf ball 148 in place. The holding clamp 150 comprises a movable contact element 152 that is configured to move between a first position in which the golf ball 148 can be placed into the holding clamp 150 and a second position that contacts the golf ball 148 and inhibits movement of the golf ball 148. For example, the movable contact element 152 may be connected to another portion of the holding clamp 150 by a hinge.

The golf ball holder 146 further includes a mounting plate 154 configured to attach to the mount 144 of the shuttle 128 via one or more mounting pins 156. The mounting pins 156 may be fixed to the mount 144 but movable relative to the mounting plate 154 in a vertical direction. For example, the mounting plate 154 may be configured to move upward such that the golf ball holder is spaced vertically from the mount 144. The mounting pins 156 may include enlarged heads to inhibit complete removal of the golf ball holder 146.

In addition to the golf ball holder 146 being movable in a vertical direction relative to the mount 144, the holding clamp 150 is also relatively movable in a horizontal direction relative to the mounting plate 154 and mount 144 through attachment of a sliding plate 158. The sliding plate 158 includes at least one slot 160 configured to receive a portion of the mounting pin 156 and thereby enables the sliding plate 158, holding clamp 150, and golf ball 148 to move in a horizontal direction relative to the mounting plate 154 and underlying shuttle 128. The size of the slot 160 may determine a range of horizontal movement of the holding clamp 150.

The relative movement of the holding clamp 150 helps to enable proper positioning and registration of the golf ball 148 with respect to a processing station. For example, the golf ball holder 146 may be configured for vertical linear movement to enable the mounting plate 154 to rest on a support surface during a printing operation. In another example, the golf ball holder 146 may be configured for horizontal linear movement between an open position depicted in FIGS. 7 and 8 and a locked position depicted in FIGS. 9 and 10. In an exemplary embodiment, the golf ball holder 146 may be biased into the open position by a corresponding magnets 162 on the holding clamp 150 and the mounting plate 154. The golf ball holder 146 may be selectively movable into the locked position through application of a linear force on the holding clamp 150 and/or the sliding plate 158. For example, a sufficient linear force may be applied to break the attraction of the magnets 162 to move the golf ball holder 146 into a locked position. When the sufficient linear force is removed, the magnets 162 may return the golf ball holder 146 into the open position.

The vertically-movable mounting plate 154 and horizontally-movable sliding plate 158 may enable the golf ball holder 146 to move into a registration position during a manufacturing process. For example, the golf ball holder 146 may be moved vertically onto a support surface to remove 168*a* load from the underlying shuttle 128 and also moved into the locked position to place the golf ball into a position directly under a printing pad of a printing station.

Figure 11:
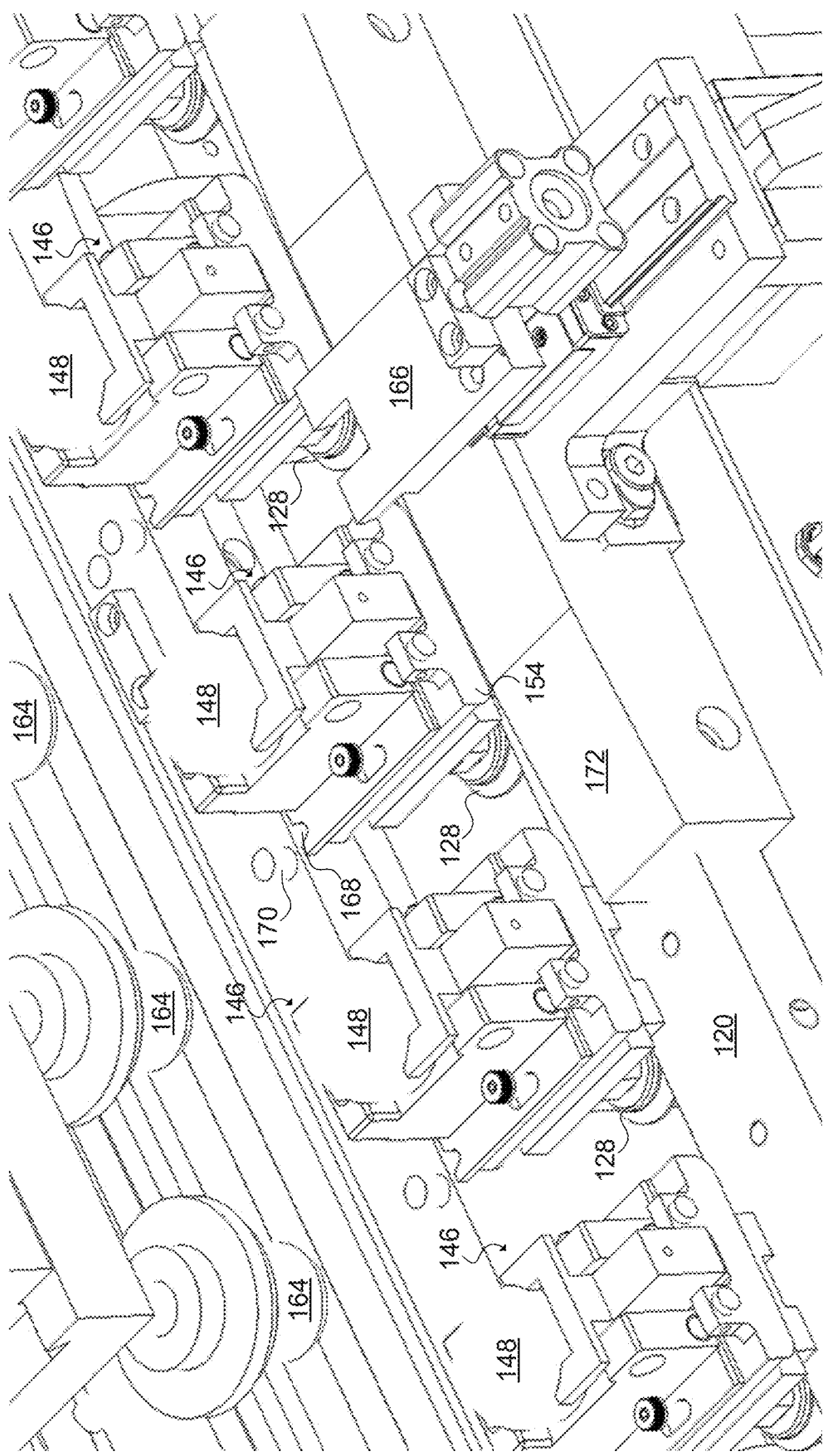
FIG. 11 is a close-up view of a portion of the printing station of FIG. 4, including a plurality of shuttles and golf ball holders being carried by the associated track, consistent with disclosed embodiments.

FIG. 11 is a close-up view of a plurality of golf ball holders 146 carried on corresponding shuttles 128 on a station track 120. The printing station 112 includes a plurality of printing pads 164 for printing on the golf balls 148 held by the golf ball holders 146. The printing station 112 may further include at least one push block 166 that is controllable (e.g., by the control system 130) to apply a linear force to push the golf ball holder 146 into the locked position (e.g., by sliding the sliding plate 158 forward and moving mounting pins 156 within the slots 160. The sliding plate 158 may further comprise one or more notches 168 configured to move and receive a corresponding stationary pin 170 on the printing station 112 to thereby lock the golf ball holder 146 into position with respect to the printing station 112 for precise and reliable printing by the printing pad 164. While only one is depicted, a plurality of adjacent push blocks 166 (e.g., one for each printing pad 164) may be provided to selectively lock a plurality of golf ball holders 146 in a printing position for simultaneous printing of on more than one golf ball 148.

The printing station 112 may also include a support rail 172 attached to the station track 120. The support rail 172 is raised relative to the station track 120 such that during movement of the shuttles 128 on the station track 120, each mounting plate 154 is configured to ride up onto the support rail 172, thereby moving the golf ball holder 146 upward with respect to the shuttle 128. The support rail 172 thereby provides support to the golf ball holder 146 such that a downward force onto the golf ball 148 (e.g., via the printing pads 164) is absorbed by the support rail 172. The support rail 172 may be sized to correspond to a single printing pad 164 or be extended under a plurality of printing pads 164. The support rail 172 thus helps to inhibit damage to the shuttles 128 that may otherwise be caused by the downward force of the printing pads 164.

The disclosed golf ball holder 146 may be considered an adapter for enabling a shuttle 128 to receive and hold a golf ball 148. The shuttle 128 is thus not limited to the embodiments shown and could include additional or alternative features for transporting a golf ball holder 146 on a track. While the golf ball holder 146 has been described in relation to a printing station 112, it should be understood that the disclosed embodiments are not limited to any particular manufacturing operation. For example, instead of pad printing, a station track may move a shuttle and golf ball holder into position for another golf ball manufacturing step, such as applying a spray paint or coating layer to an in-process golf ball. Such a golf ball holder may include similar features for enabling movement (i.e., locking) relative to the shuttle to position the golf ball with respect to the processing equipment.

Figure 12:
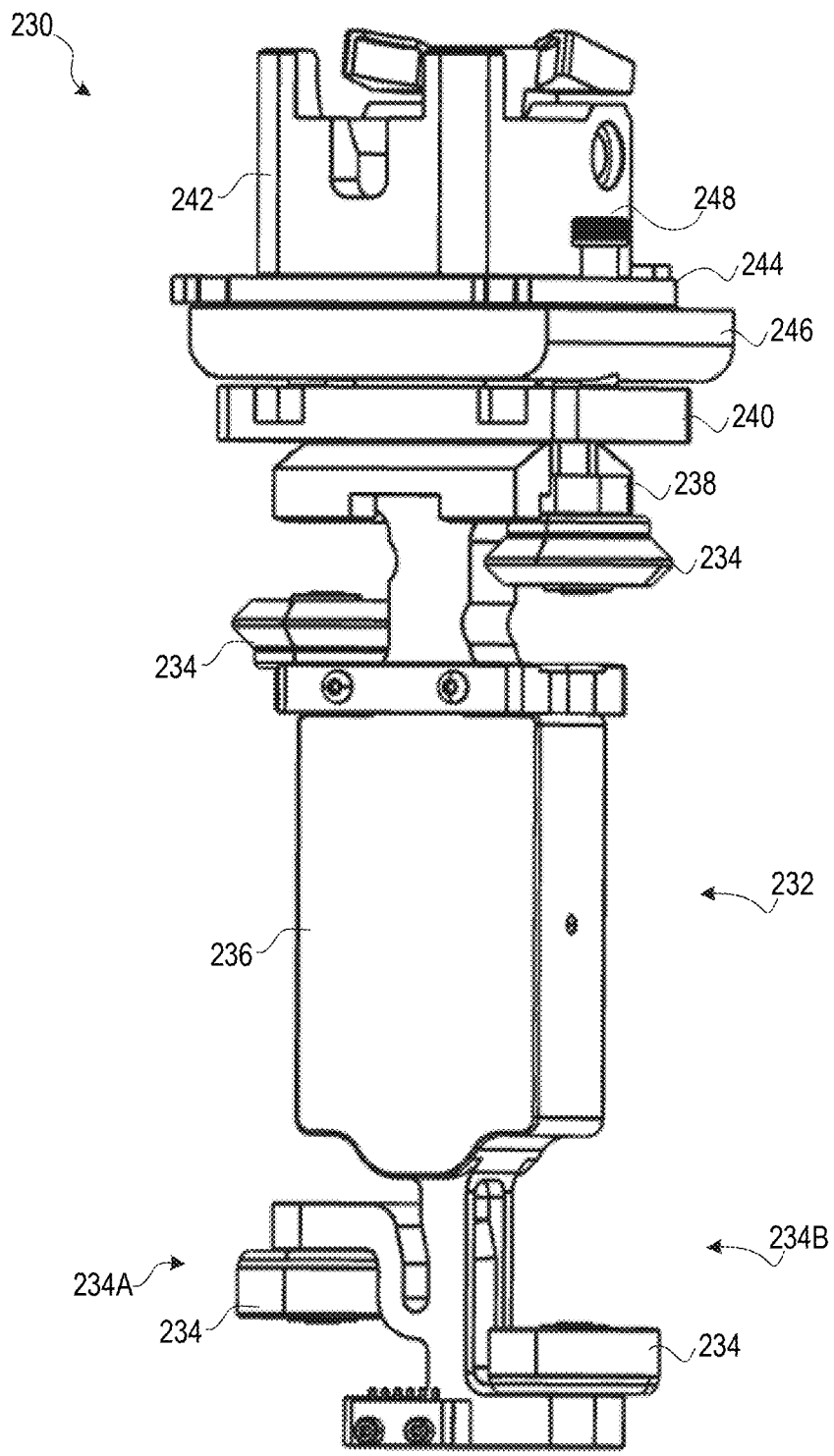
FIG. 12 is a perspective view of a golf ball holder on a shuttle, according to another embodiment.

FIGS. 12-22 depict another embodiment of a golf ball holder 230 mounted to a shuttle 232. FIG. 12 is a perspective view of the golf ball holder 230 and shuttle 232. The shuttle 232 may be used in conjunction with the transportation system 100 described herein. The shuttle 232 may be the same as or similar to the shuttle 128 described in relation to FIGS. 5 and 6. For example, the shuttle 232 may include bearings 234 configured to enable movement of the shuttle 232 on the side of a track (e.g., the primary track 116). The shuttle 232 may particularly include bearings 234 on two sides of a stanchion 236 to enable transfer of the shuttle 232 from one track to another. For example, the shuttle 128 may include a first side bearing 234A and a second side bearing 234B on opposing sides. The first side bearing 234A may be configured to ride the primary track 116 and the second side bearing 234B may be configured to ride on the plurality of station tracks 118, 120, 122. The shuttle 232 may further include an attachment member 238 attached to the stanchion 236 and configured to support the golf ball holder 230. A mount 240 is positioned between the golf ball holder 230 and the attachment member 238 to connect the golf ball holder 230 to the shuttle 232. The mount 240 may be considered part of the golf ball holder 230 or the shuttle 232.

Figure 13:
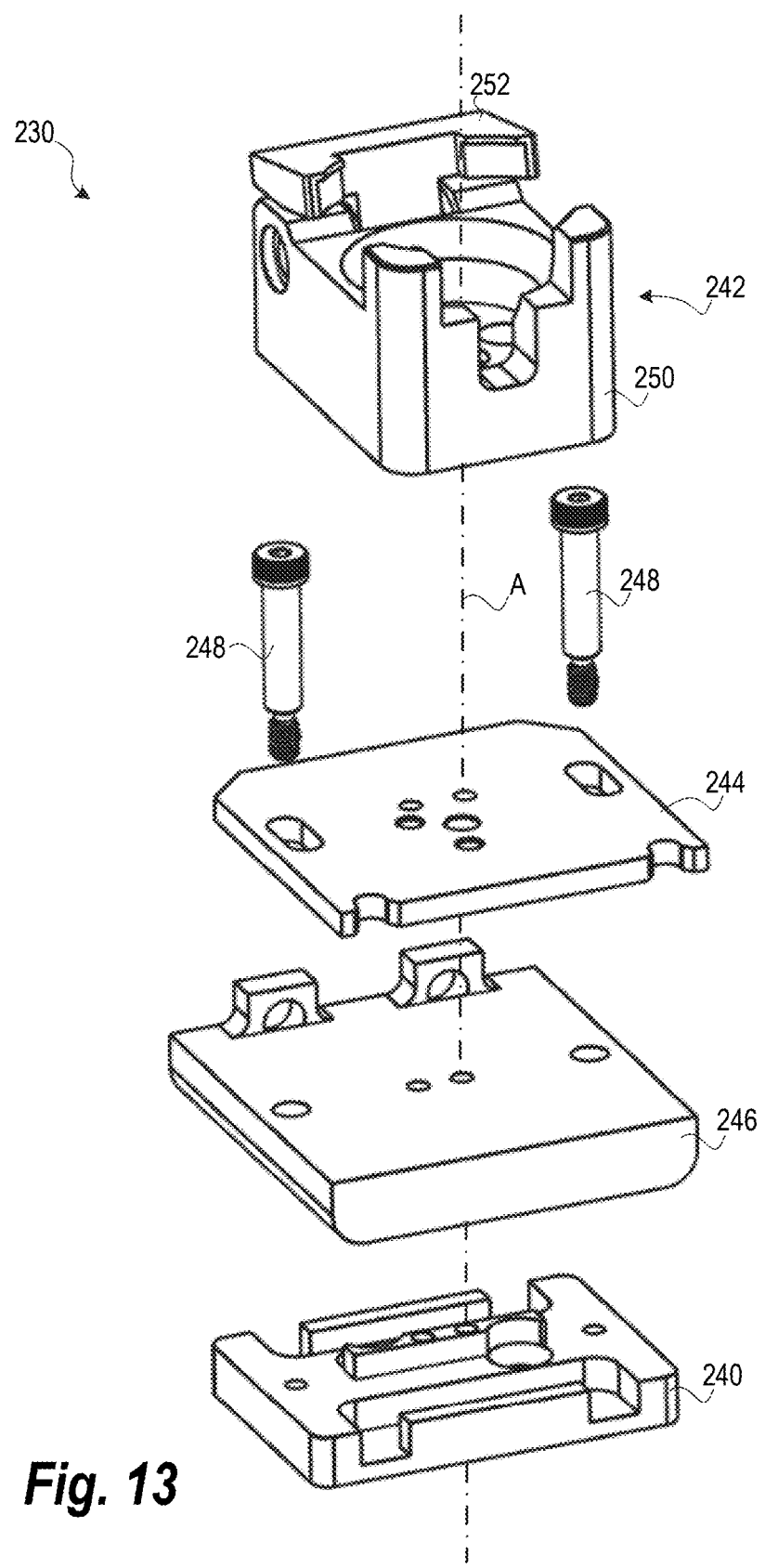
FIG. 13 is an exploded view of the golf ball holder of FIG. 12, consistent with the disclosed embodiments.

FIG. 13 shows an exploded view of the golf ball holder 230. The golf ball holder 230 includes a holding clamp 242, a sliding plate 244, a mounting plate 246, and a pair of mounting pins 248. The holding clamp 242 is configured to be rigidly attached to the sliding plate 244 (e.g., via bolts/screws). The mounting pins 248 are configured to pass through the sliding plate 244 and the mounting plate 246 and rigidly attach to the mount 240. As shown in FIGS. 12 and 13, the components of the golf ball holder 230 and the shuttle 232 are arranged such that they are generally stacked along a vertical axis A. In an exemplary embodiment, the mounting pins 248 extend longitudinally in a direction along and/or parallel to the vertical axis A.

Figure 14:
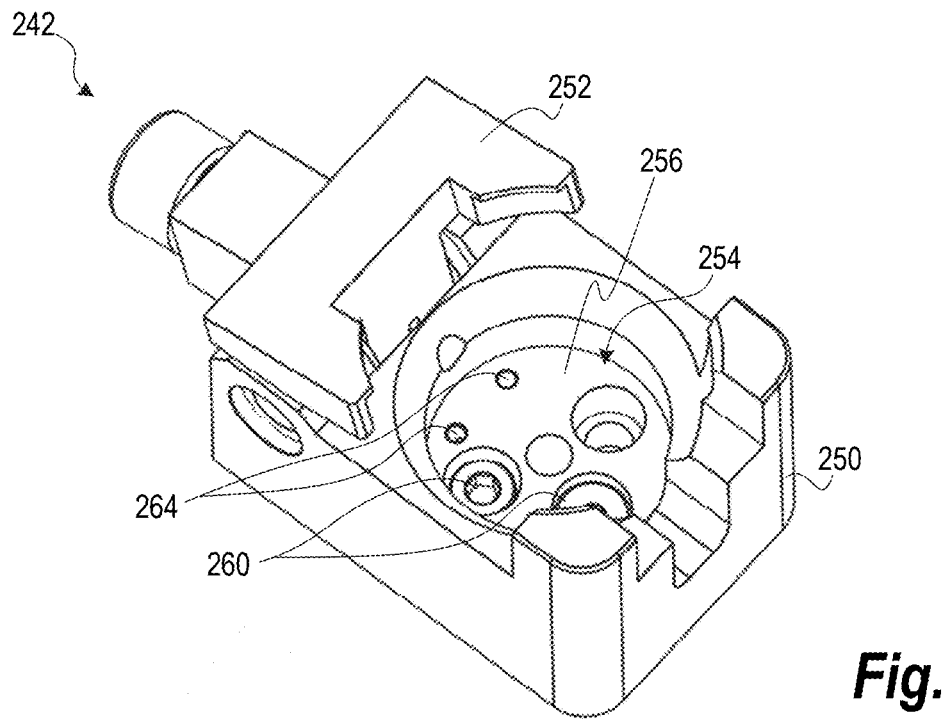
FIG. 14 is a top perspective view of a holding clamp, consistent with disclosed embodiments.
Figure 15:
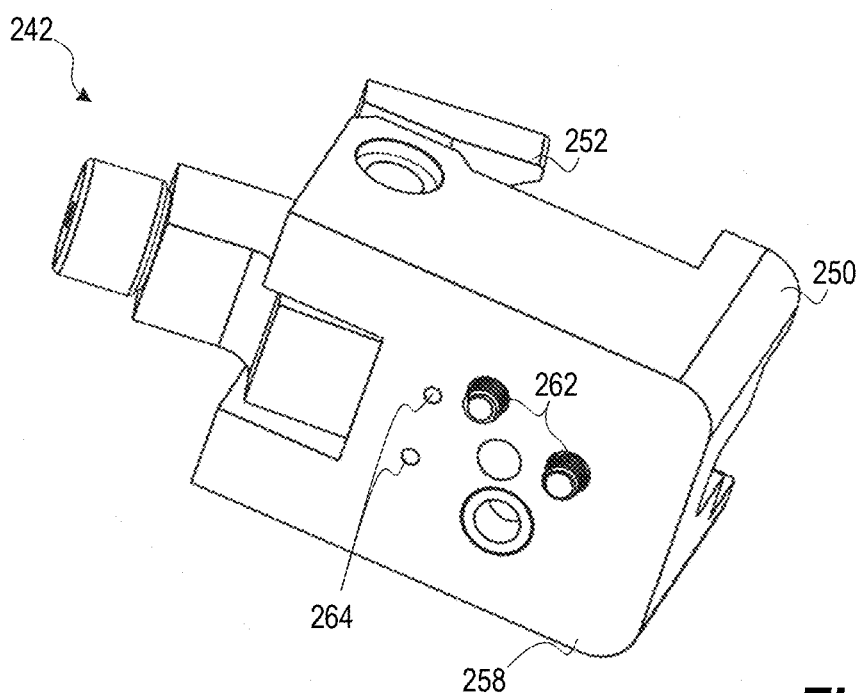
FIG. 15 is a bottom perspective view of the holding clamp of FIG. 14, consistent with disclosed embodiments.

FIGS. 14 and 15 further illustrate the holding clamp 242. The holding clamp 242 includes a cup 250 and a movable contact element 252. The cup 250 may be a cradle or other shape having a configuration for supporting a golf ball. The movable contact element 252 is configured to move into and out of contact with a golf ball in the cup 250 in order to hold the golf ball in place. In an exemplary embodiment, the cup 250 includes a cavity 254 and a cavity surface 256. In an embodiment, the cavity surface 256 may be flat in a plane perpendicular to the vertical axis A. The holding clamp 242 further includes a bottom surface 258. The bottom surface 258 may also be flat in a plane perpendicular to the vertical axis A. The holding clamp 242 may include one or more mounting holes 260 and screws 262 for attachment to the sliding plate 244. The holding clamp 242 further includes at least one service through hole 264 extending from the cavity surface 256 to the bottom surface 258. In the embodiment shown, the holding clamp 242 includes two service through holes 264. The service through holes 264 extend along and/or parallel to the vertical axis A.

Figure 16:
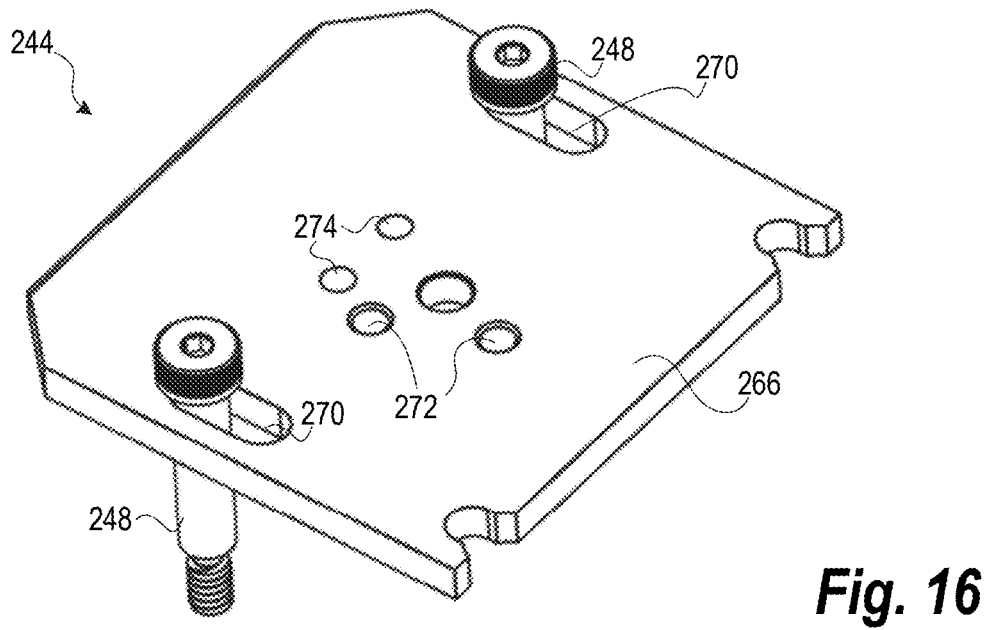
FIG. 16 is a top perspective view of a sliding plate, consistent with disclosed embodiments.
Figure 17:
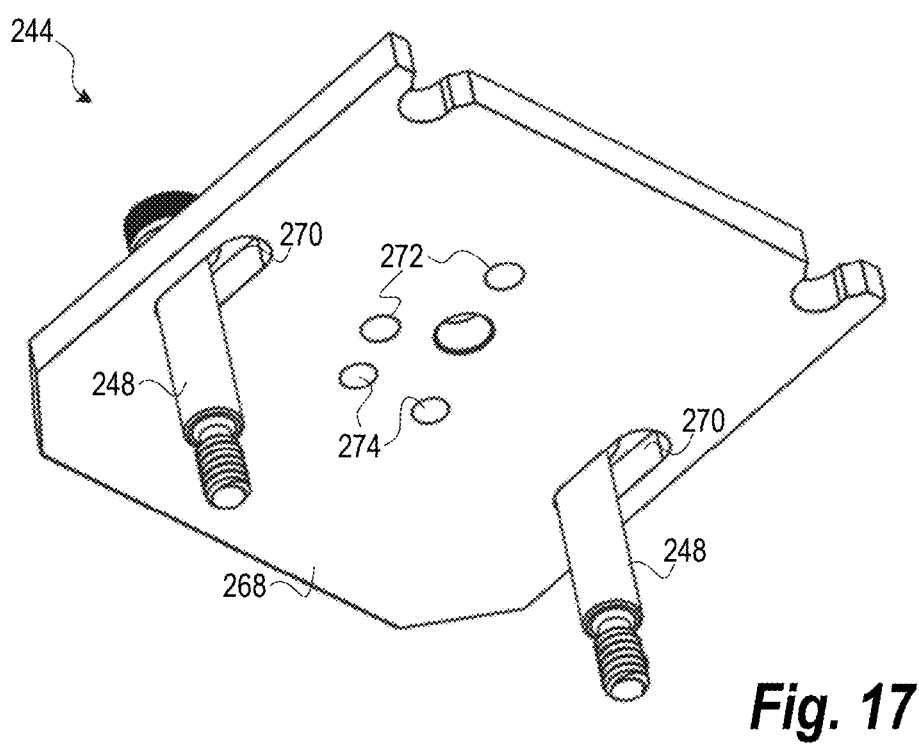
FIG. 17 is a bottom perspective view of the sliding plate of FIG. 16, consistent with disclosed embodiments.

FIGS. 16 and 17 further illustrate the sliding plate 244 and the mounting pins 248. The sliding plate 244 includes a top surface 266 and a bottom surface 268. The top surface 266 and the bottom surface 268 may be flat surfaces. The holding clamp 242 is configured to rest on the top surface 266. The sliding plate 244 further includes at least one slot 270. The slots 270 are configured to receive the mounting pins 248. The sliding plate 244 is configured to move in the plane of the sliding plate 244 relative to the mounting pins 248 in the slots 270. The sliding plate 244 further includes mounting holes 272 configured to receive the screws 262 to rigidly mount holding clamp 242 to the sliding plate 244. The sliding plate 244 further includes at least one service through hole 274. In the embodiment shown, the sliding plate 244 includes two service through holes 274. The service through holes 274 extend along and/or parallel to the vertical axis A.

Figure 18:
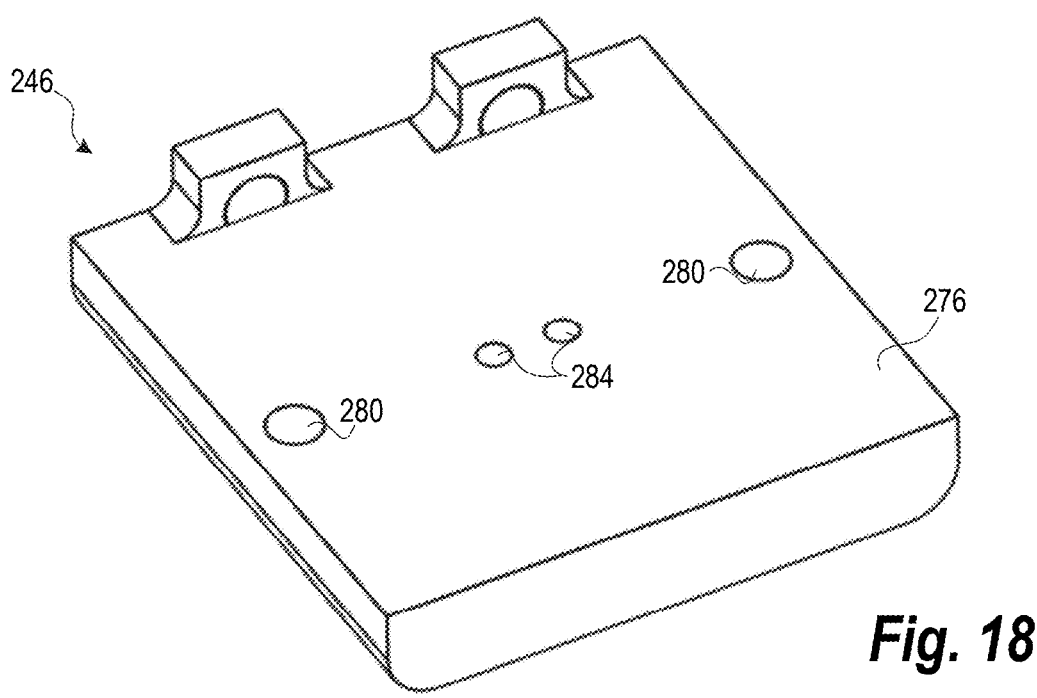
FIG. 18 is a top perspective view of a mounting plate, consistent with disclosed embodiments.
Figure 19:
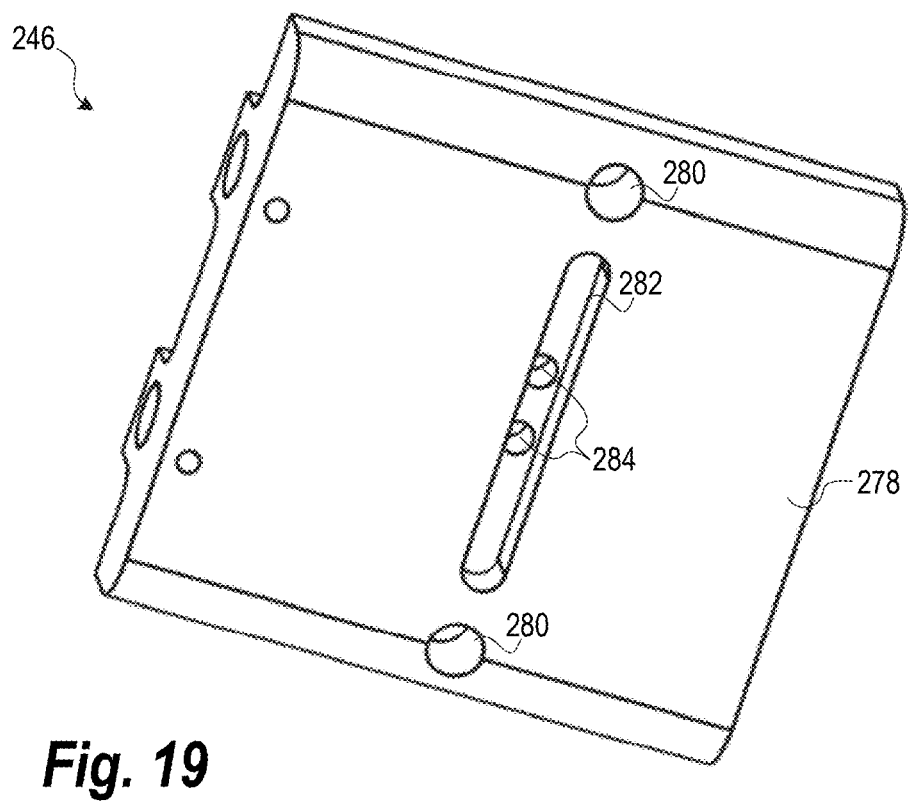
FIG. 19 is a bottom perspective view of the mounting plate of FIG. 18, consistent with disclosed embodiments.

FIGS. 18 and 19 further illustrate the mounting plate 246. The mounting plate 246 includes a top surface 276 and a bottom surface 278. The top surface 276 and the bottom surface 278 may be flat surfaces. The sliding plate 244 is configured to rest on the top surface 276. The mounting plate 246 further includes at least one pin through hole 280 configured to receive the mounting pins 248. The mounting pins 248 pass through the pin through holes 280 without rigid attachment to thus enable the mounting plate 246 to move vertically relative to the mounting pins 248. The mounting plate 246 further includes a surface slot 282 formed in the bottom surface 278. The mounting plate 246 further includes at least one service through hole 284. In the embodiment shown, the mounting plate 246 includes two service through holes 284. The service through holes 284 extend along and/or parallel to the vertical axis A. In an exemplary embodiment, the service through holes 284 are aligned with the surface slot 282 such that the bottom opening of the service through holes 284 are in the surface slot 282.

Figure 20:
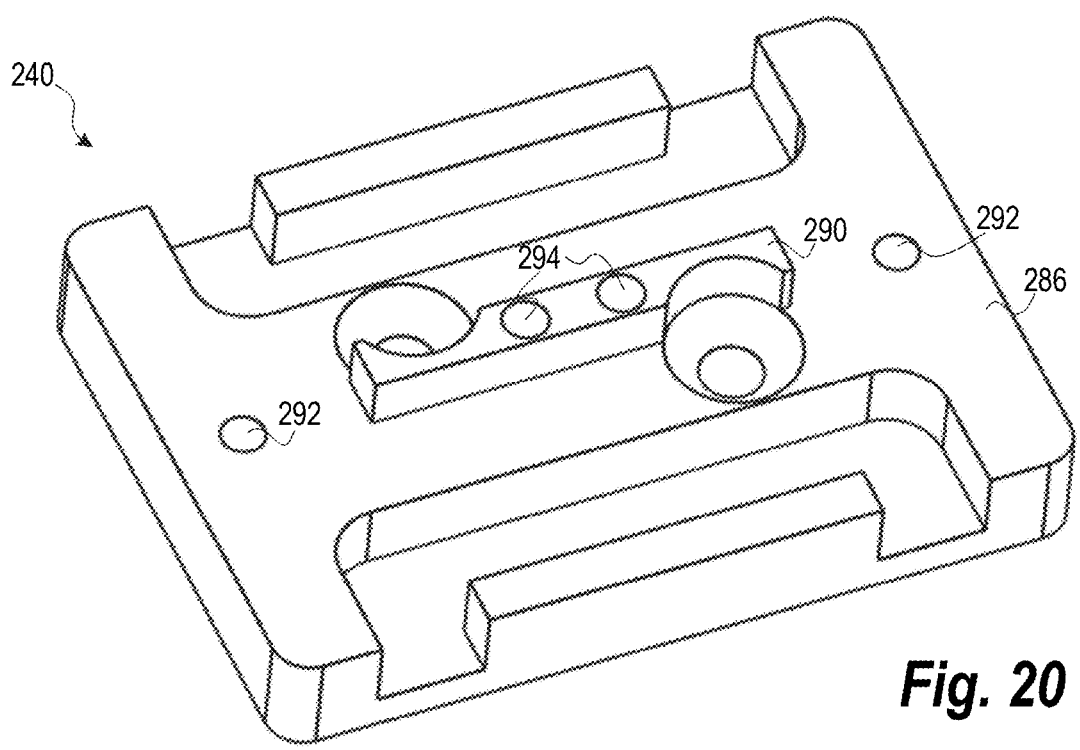
FIG. 20 is a top perspective view of a mount, consistent with disclosed embodiments.
Figure 21:
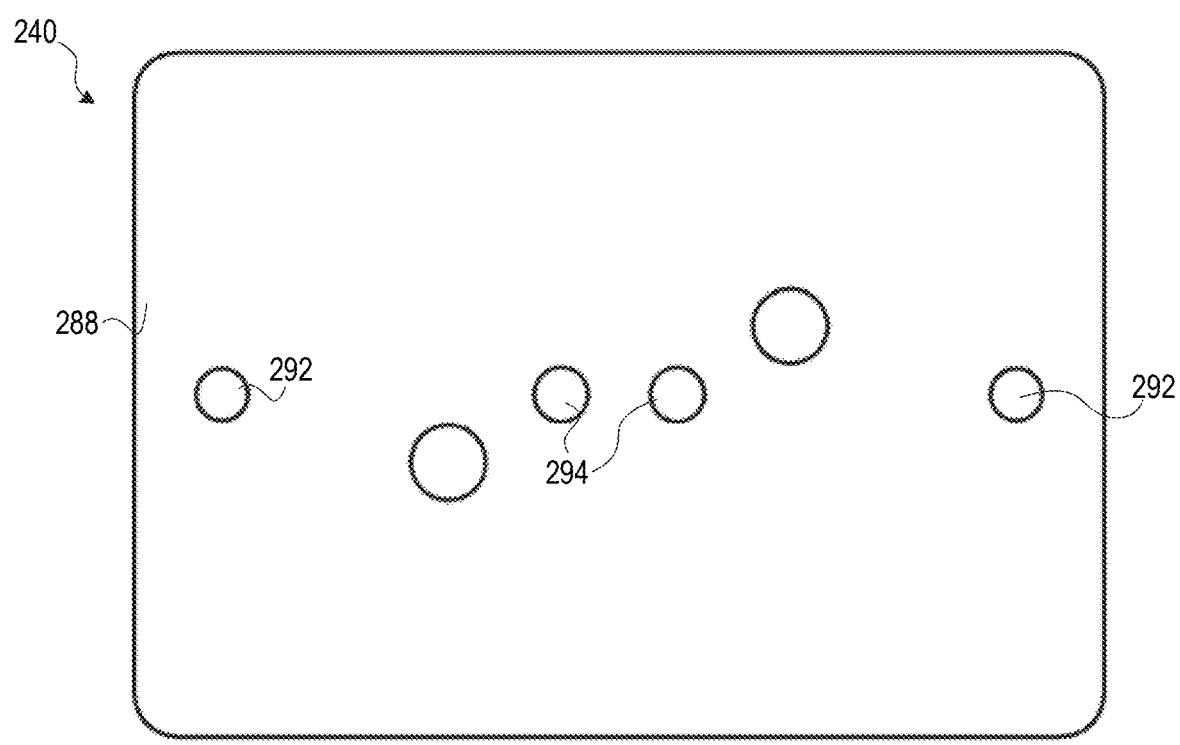
FIG. 21 is a bottom perspective view of the mount of FIG. 20, consistent with disclosed embodiments.

FIGS. 20 and 21 further illustrate the mount 240. The mount 240 includes a top surface 286 and a bottom surface 288. The bottom surface 288 may be a flat surface configured to be mounted to the attachment member 238 of the shuttle 232. The mount 240 may further include a protrusion 290 configured to fit within the surface slot 282 of the mounting plate 246. The mounting plate 246 is configured to rest on the top surface 286 of the mount 240 and move vertically relative to each other. The mount 240 further includes attachment holes 292 configured to receive threaded portions of mounting pins 248 for rigid attachment. The mount 240 includes at least one service through hole 294. In the embodiment shown, the mount 240 includes two service through holes 294. The service through holes 294 extend along and/or parallel to the vertical axis A. In an exemplary embodiment, the service through holes 294 are aligned with the protrusion 290 such that the top opening of the service through holes 294 are on top of the protrusion 290. The service through holes 294 extend to the bottom surface 288 and provide access to a portion of the shuttle 232.

During operation of a golf ball transportation system including a golf ball holder and shuttle as described in the present disclosure, the bearings of the shuttle should be properly lubricated for smooth and consistent travel on a disclosed track system. It may be difficult to quickly and easily provide lubrication to the bearings of the shuttles while they are attached to the track. The golf ball holder 230 may be configured with features to allow for efficient lubrication of the bearings 234 of the shuttle 232.

Figure 22:
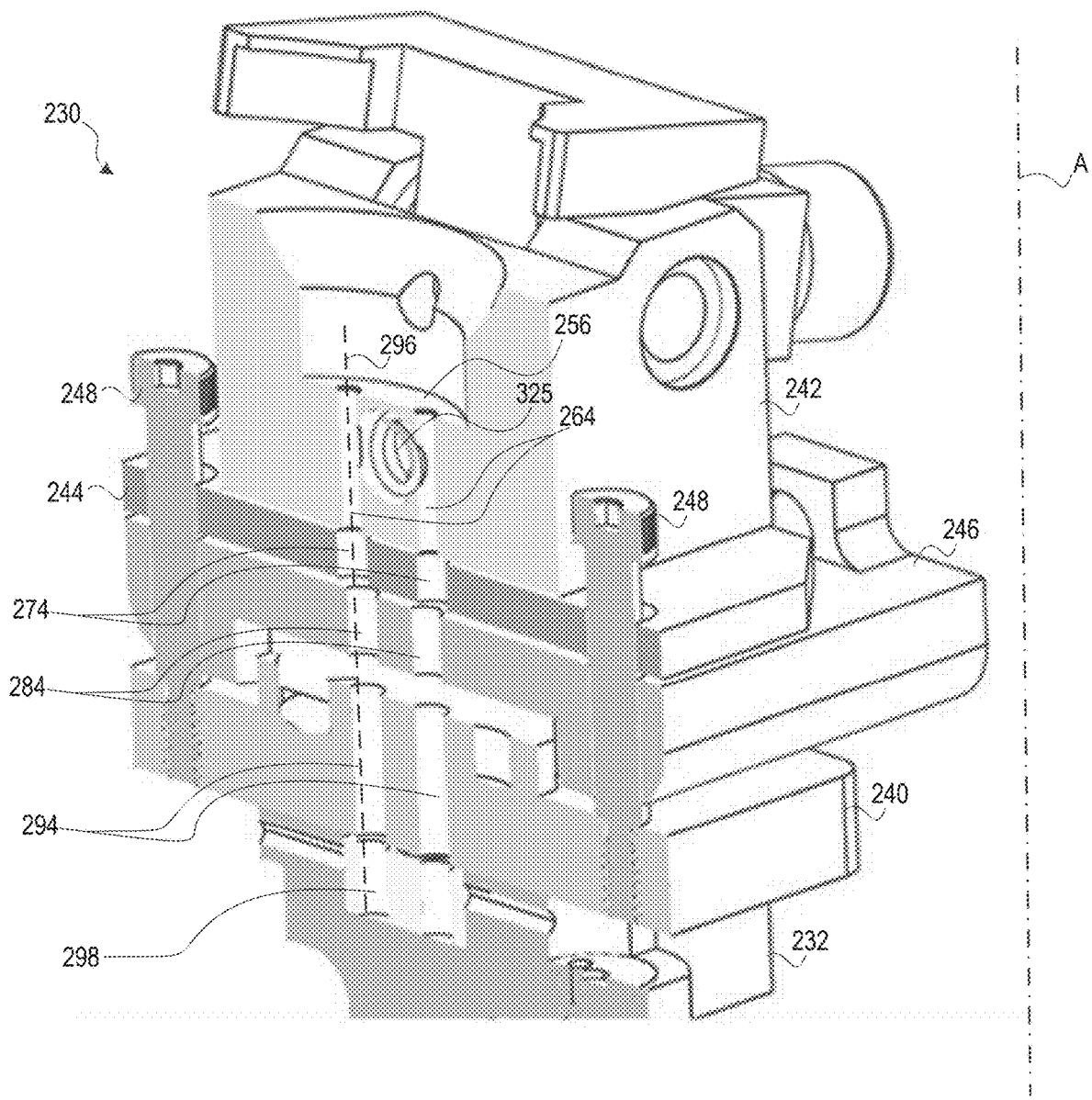
FIG. 22 is a cross-sectional view of the golf ball holder and shuttle of FIG. 12, further depicting a service pathway, consistent with disclosed embodiments.
Figure 23A:
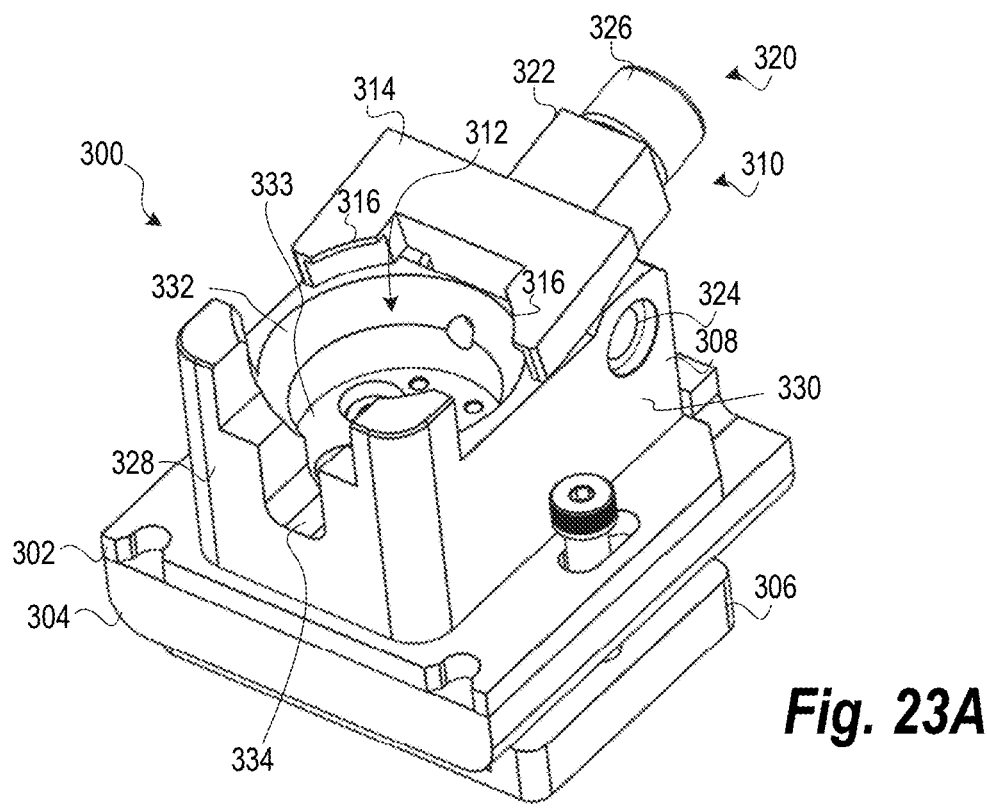
FIG. 23A is a perspective view of a holding clamp in a locked position, consistent with disclosed embodiments.
Figure 23B:
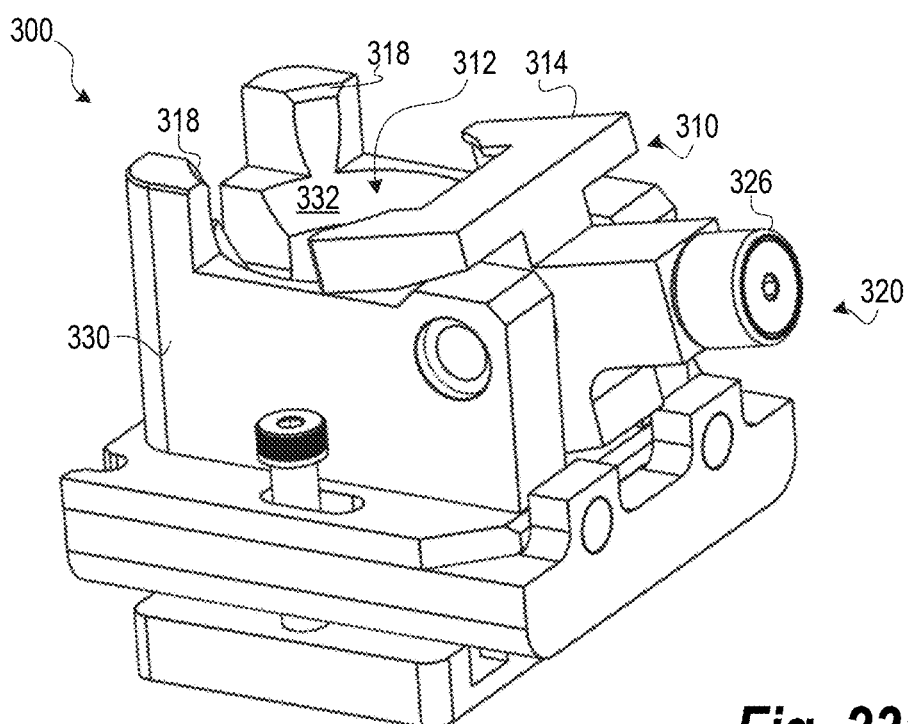
FIG. 23B is another perspective view of the holding clamp of FIG. 23A, consistent with disclosed embodiments.

FIG. 22 is a cross-sectional view of the golf ball holder 230 attached to the attachment member 238 of the shuttle 232. The service through holes 264, 274, 284, and 294 are positioned on the respective components such that when the holding clamp 242, sliding plate 244, mounting plate 246, and mount 240 are in position and stacked in a vertical direction, a service pathway 296 is formed, as shown in FIG. 22. The service pathway 296 extends from the cavity surface 256 of the holding clamp 242 to the bottom surface 288 of the mount 240. The service pathway 296 may be a continuous vertical column of space configured to receive a lubricating tool, such as a needle configured to supply lubricant. The service pathway 296 is configured such that a vertical line along and/or parallel to the vertical axis A can be drawn through the holding clamp 242, sliding plate 244, mounting plate 246, and mount 240 without being colliding with a physical portion of any of these parts. In this way, a needle can be inserted into the service through holes 264 at the cavity surface 256 and lubricant can be delivered to the shuttle 232 using the cavity 254 as an entry point. The shuttle 232 may be configured with openings in or around the attachment member 238 and further pathways 298 to deliver the lubricant to the bearings 234. The resulting configuration helps to enable quick and efficient servicing of the shuttles 232 without having to remove the shuttles 232 from the track and/or without removing the golf ball holder 230 from the shuttle 232.

FIGS. 23A-23B and 24A-24B further illustrate an exemplary embodiment of a holding clamp 300. The holding clamp 300 may be the same or similar to the holding clamp 242. The holding clamp 300 is configured to be mounted to a sliding plate 302, a mounting plate 304, and a mount 306 for being attached to a shuttle, consistent with disclosed embodiments. The holding clamp 300 includes a cup 308 and a movable contact element 310. The cup 308 defines a cavity 312 for receiving a golf ball (or golf ball subassembly).

Figure 24A:
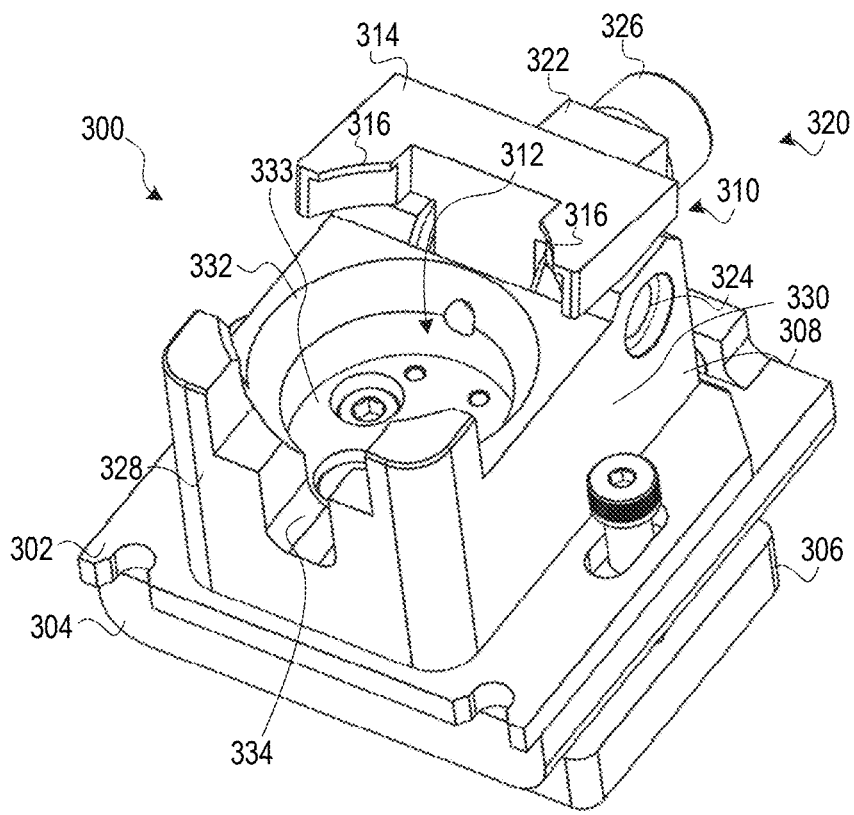
FIG. 24A is a perspective view of the holding clamp of FIGS. 23A-23B in an unlocked position, consistent with disclosed embodiments.
Figure 24B:
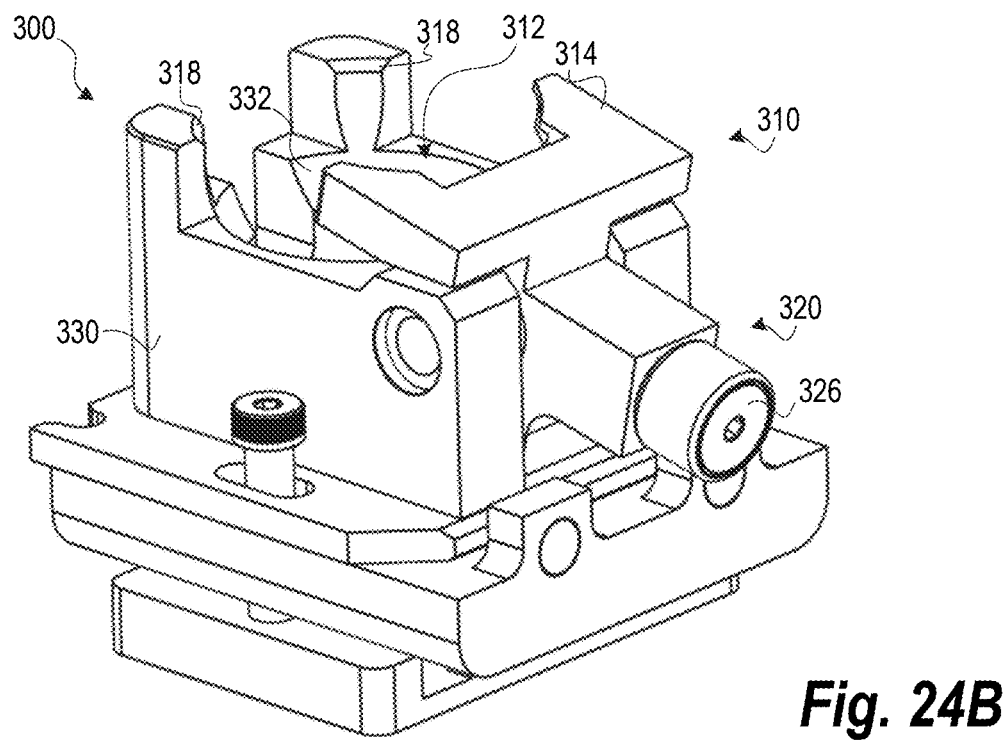
FIG. 24B is another perspective view of the holding clamp of FIG. 24A, consistent with disclosed embodiments.

The movable contact element 310 is configured to move between a locked position (shown in FIGS. 23A-23B) and an unlocked position (shown in FIGS. 24A-24B). In an exemplary embodiment, the movable contact element 310 includes a brace 314 including at least one contact point 316 for contacting the golf ball. The brace 314 may be in the form of a yoke element with two contact points 316. In an embodiment, the holding clamp 300 includes two movable contact points 316 on the brace 314 and two stationary contact points 318 on the cup 308. The stationary contact points 318 are positioned on a side of the cup 308 opposite the brace 314 to thereby create opposing contact points that counteract and securely hold the golf ball. The contact points 316, 318 may be configured as a curved ledge or lip that contacts a corresponding side portion of the golf ball. The contact points 316, 318 may thus contact more than only a point on the golf ball, and may contact, for example, a small linear contact area on the golf ball. The contact points 316 move into contact with a golf ball when the movable contact element 310 is in the locked position such that the golf ball is securely held in a position and orientation in the cavity 312 by the four contact points 316, 318. The contact points 316 are moved out of contact with the golf ball as the movable contact element 310 moves out of the locked position and into the unlocked position. In the unlocked position, the golf ball is freely movable out of the cavity 312.

The movable contact element 310 further include a rotation assembly 320. The rotation assembly 320 may include a block 322, a hinge 324, and a bumper 326. The block 322 is attached to the cup 308 by the hinge 324, thereby enabling the block 322 to pivot relative to the cup 308. The brace 314 is rigidly connected to the block 322 and thereby moves with the rotation of the block 322. The hinge 324 may include a locking element (e.g., a spring 325 shown in FIG. 22) that locks the movable contact element 310 in the locked position and is releasable to the unlocked position via the bumper 326. In an exemplary embodiment, the spring 325 provides a force that inhibits the block 322 from pivoting until it is compressed. For example, the movable contact element 310 may be configured such that a force applied to the bumper 326 compresses the spring 325 and moves the brace 314 and block 322 from the locked position to the unlocked position. Similarly, an opposite force on the bumper 326 causes the brace 314 and block 322 to pivot from the unlocked position to the locked position (e.g., by releasing the spring 325).

In an exemplary embodiment, the cup 308 may include a front wall 328 and a pair of side walls 330. The side walls 330 may be attached to the movable contact element 310 by the hinge 324. The cavity 312 is defined within the front wall 328 and side walls 330. The cavity 312 may be generally cylindrical with a support surface 332 for supporting the golf ball. The support surface 332 is configured to contact the golf ball below a centerline of the golf ball in the cavity 312. Further, the support surface 332 is positioned above a cavity surface 333 at a bottom of the cavity 312. As a result, there is space below the support surface 332 within the cavity 312. The support surface 332 may be angled and/or curved to generally match the curvature of a golf ball. In this way, the support surface 332 may support a perimeter portion of the golf ball spaced from a polar region that rests at or near the cavity surface 333. In an exemplary embodiment, the stationary contact points 318 may be formed as a continuation of the support surface 332 and contact the golf ball above the centerline.

In an exemplary embodiment, the cup 308 further includes a cutout 334 formed in a wall thereof, such as the front wall 328. The cutout 334 provides a direct path into the cavity 312 other than through the open top portion of the cup 308. In particular, the cutout 334 provides a direct path to a point below a centerline of a golf ball positioned in the cavity 312 and supported on the support surface 332. Further, in some embodiments, at least part of the space in the cavity 312 accessed by a direct path through the cutout is below the support surface 332, which, as shown, may be positioned above the cavity surface 333, thereby providing access to a lower portion of a golf ball resting in the cavity 312. In an exemplary embodiment, the cutout 334 is in the front wall 328 and therefore on an opposite side of the hinge 324. In an exemplary embodiment the cutout 334 is generally U-shaped and formed in the front wall 328 between the stationary contact points 318. The cutout 334 may include a middle section that extends lower than a pair of stepped side sections leading up to the contact points 318. A bottom of the cutout 334 may include a chamfered and curved edge. While the cutout 334 shown is an example embodiment, other configurations of opening and/or holes may be formed as a cutout configured to receive a tool therethrough to reach a golf ball.

Figure 25:
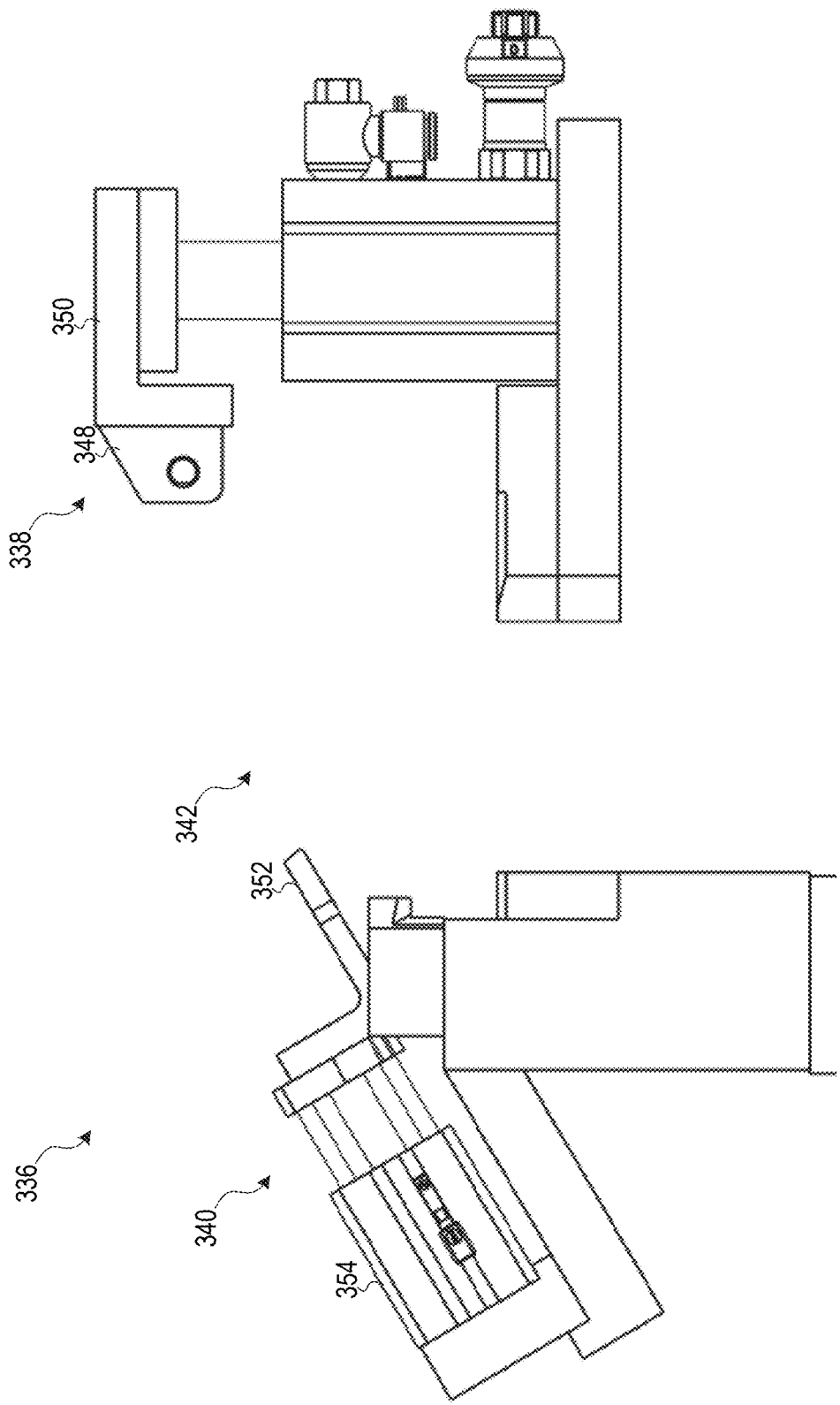
FIG. 25 is a side view of an offloading station, consistent with disclosed embodiments.
Figure 26:
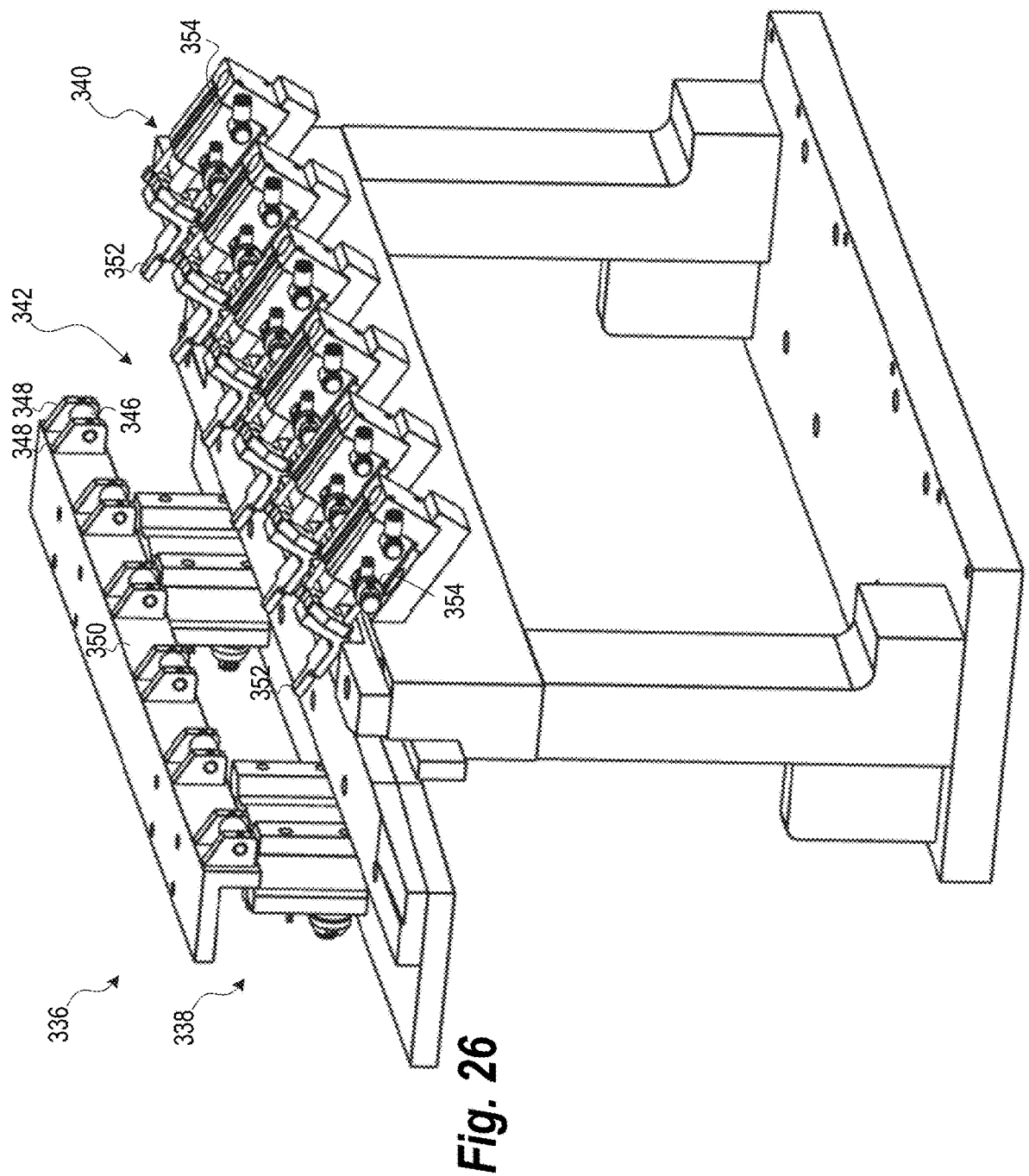
FIG. 26 is a perspective view of the offloading station of FIG. 25, consistent with disclosed embodiments.
Figure 27:
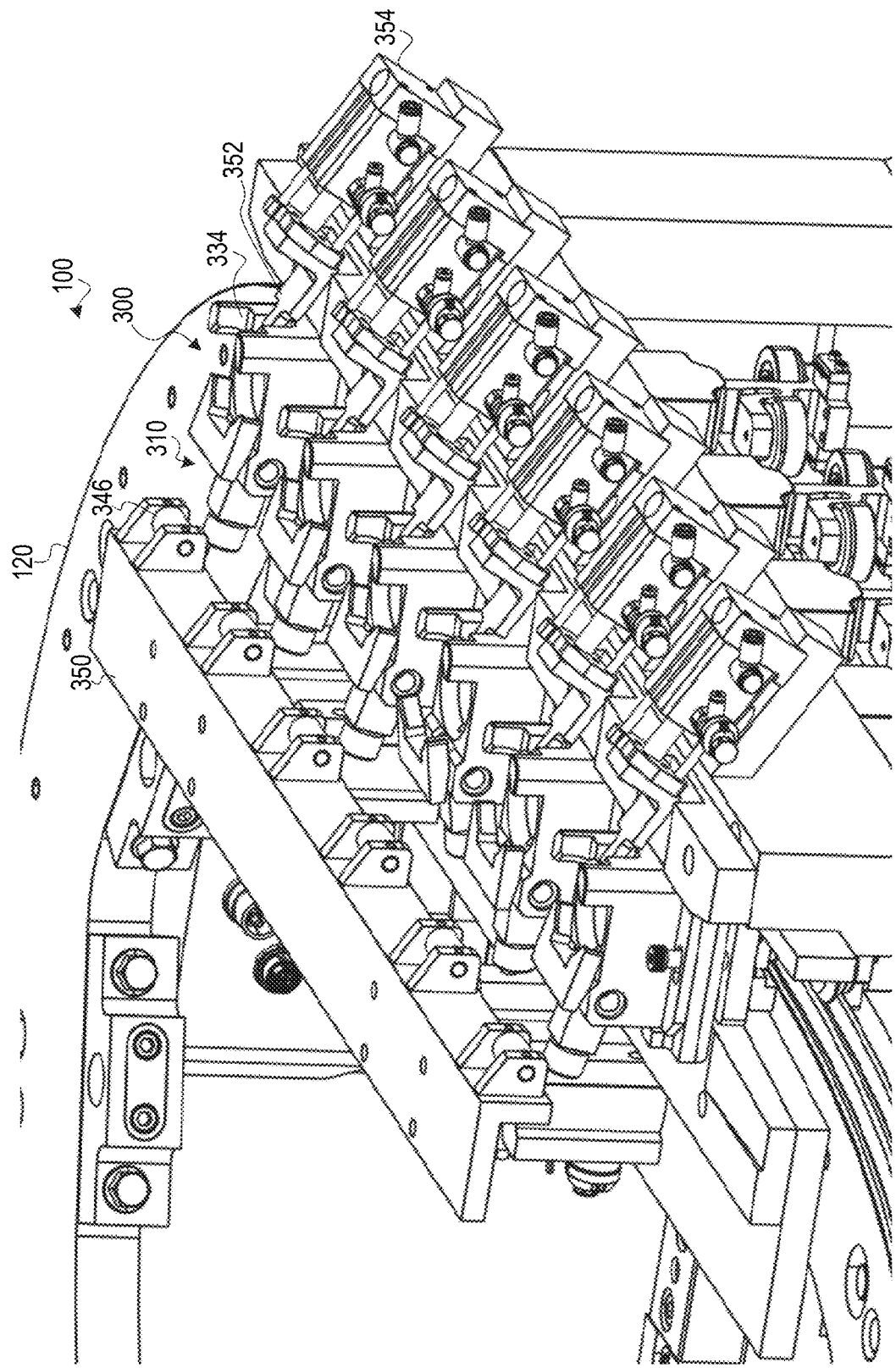
FIG. 27 is a perspective view of a portion of the offloading station of FIGS. 25-26, including a plurality of shuttles and golf ball holders being carried by the associated track, consistent with disclosed embodiments.

FIG. 25 is a side view and FIG. 26 is a perspective view of an offloading station 336 that may be used in conjunction with the golf ball transportation system 100 disclosed herein. FIG. 27 is a perspective view of the offloading station 336 positioned in relation to a station track 120 supporting a plurality of holding clamps 300. The offloading station 336 includes at least one release mechanism for interacting with the holding clamp 300 in order to enable a golf ball to be removed from the cup 308. For example, the offloading station 336 may include a clamp release mechanism 338 and a ball lifting mechanism 340. As shown in FIG. 26, the offloading station 336 may include a plurality of clamp release mechanisms 338 and a plurality of ball lifting mechanisms 340. The offloading station 336 includes a space 342 for the station track 120 and plurality of holding clamps 300 to be positioned near the clamp release mechanisms 338 and ball lifting mechanisms 340. In an exemplary embodiment, the clamp release mechanism 338 may include a component capable of moving into contact with a portion of the movable contact element 310 to release the brace 314 from holding a golf ball. The golf ball may be thereafter accessible by an offloading tool, such as an arm or tool capable of picking and moving the golf ball. In some instances, the golf ball may benefit from being urged out of the cup 308 in order to facilitate picking of the golf ball. The ball lifting mechanism 340 may include a movable element to contact and eject the golf ball from its resting position in the cup 308. For example, a movable element may contact a lower portion of the resting golf ball via the cutout 334 in the front wall 328 of the cup 308.

In an exemplary embodiment, the clamp release mechanism 338 includes a toggle 344. The toggle 344 is configured to be moved into contact with the bumper 326 of a holding clamp 300. For example, the toggle 344 may be moved downward into contact with the bumper 326 to cause the movable contact element 310 to unlock and move from a locked position to an unlocked position. The toggle 344 may include a roller 346 attached to two bearing mounts 348. The toggle 344 may be attached to a bridge 350. In an exemplary embodiment, a plurality of toggles 344 are attached to the bridge 350. The bridge 350 is configured to move in a downward direction (e.g., via pneumatic cylinders) to correspondingly move the toggles 344. In operation, a plurality of shuttles may transport a plurality of holding clamps 300 to positions adjacent the bridge 350. The bridge 350 may then be actuated to move the rollers 346 into contact with the bumpers 326 of the holding clamps 300, thereby unlocking the movable contact elements 310 and enabling the golf balls to be picked up and removed from the cups 308.

The ball lifting mechanisms 340 may be positioned to further assist with removing the golf balls from the cups 308. In an exemplary embodiment, the ball lifting mechanism 340 includes an ejector finger 352 and a motion device 354, such as pneumatic cylinder or motor. The ejector finger 352 may include an L-shaped configuration with a first portion mounted to the motion device and a perpendicular second portion extending in a slightly upward path toward the space 342. The extending portion may include a thicker proximal portion and a thinner distal portion with a rounded transition therebetween. The thinner distal portion may be configured to fit within the cutout 334 of the cup 308 to thereby contact a golf ball in the cavity 312. The ejector finger 352 extends in an upward angled direction toward the front wall 328 of the holding clamps 300. The motion device 354 causes the ejector finger 352 to translate forward. When a holding clamp 300 is positioned in front of an ejector finger 352, the motion device 354 may be activated to cause the ejector finger 352 to move through the cutout 334 of the holding clamp 300. The ejector finger 352 moves through the cutout 334, thereby contacting a golf ball in the cavity 312 of the holding clamp 300 and urging the ball upward out of contact with the support surface 332 and promoting ease of removal of the golf ball from the cup 308.

Embodiments of the disclosed offloading station and holding clamp work in combination to assist removal of golf balls from a disclosed transportation system. Disclosed holding clamps include lockable clamp elements that securely hold golf balls in place for an operation such as printing at a printing station prior to arriving at the offloading station. The offloading station may include features to unlock the holding clamps to enable the golf balls to be removed. The offloading station may further include a mechanism to urge the golf ball out of the holding clamp, thereby further assisting golf ball removal.

An exemplary offloading process may be preceded by another process (e.g., a printing process) that includes a plurality of golf balls locked into a corresponding plurality of holding clamps. After the prior process is complete, the holding clamps carrying the golf balls may travel on a disclosed primary track before being transferred to a station track associated with an offloading station. A plurality of holding clamps may successively stop in positions within the offloading station. For example, a plurality of holding clamps may stop in equally-spaced positions at the offloading station and hold in position, such as that shown in FIG. 27. When a predetermined number of holding clamps (e.g., 6 as shown) are in position within the offloading station, a disclosed clamp release mechanism may be activated, causing a bridge attached to a plurality of toggles to move into contact with the movable contact elements of the stopped holding clamps, thus unlocking all of the holding clamps simultaneously. Next, disclosed ball lifting mechanisms may be similarly activated, causing ejector fingers to extend through the cutouts in the cups of the holding clamps, thereby urging the golf balls out of the associated cavities. An arm or tool can thereafter easily securely pick the golf balls out of the holding clamps and move them to another portion of the offloading station, such as a tray loading area.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

The invention claimed is:

1. A golf ball holder configured to be attached to a shuttle that is configured to be attached to a track for movement of the golf ball holder along the track, the golf ball holder comprising:
   a holding clamp configured to receive the golf ball and maintain an orientation of the golf ball;
   a sliding plate comprising a top surface and a bottom surface and a slot;
   a mounting plate comprising a top surface and a bottom surface and a pin through hole;
   a mount comprising a top surface and a bottom surface and an attachment hole, wherein the bottom surface is configured to be mounted to the shuttle; and
   a mounting pin,
   wherein the golf ball holder is configured to be arranged with the holding clamp, sliding plate, mounting plate, and mount stacked in a direction parallel to an axis with the mounting pin extending in the direction parallel to the axis and positioned in the slot, the pin through hole, and the attachment hole.

2. The golf ball holder of claim 1, wherein the holding clamp comprises a movable contact element configured to move between an open position and a locked position.

3. The golf ball holder of claim 2, wherein the holding clamp comprises a cup defining a cavity for receiving the golf ball, wherein the movable contact element maintains the golf ball in the cavity when in the locked position.

4. The golf ball holder of claim 1, wherein the mounting pin is fixed to the mount and the mounting plate is movable with respect to the mount in the direction parallel to the axis.

5. The golf ball holder of claim 4, wherein the mounting plate comprises a surface slot in the bottom surface of the mounting plate and the mount comprises a protrusion on the top surface of the mount, wherein the protrusion fits within the surface slot.

6. The golf ball holder of claim 1, wherein the mounting pin is fixed to the mount and the sliding plate is movable with respect to the mount in a direction perpendicular to the axis.

7. The golf ball holder of claim 1, comprising two mounting pins, and wherein the sliding plate comprises two slots, the mounting plate comprises two through holes, and the mount comprises two attachment holes.

8. The golf ball holder of claim 1, further comprising a service pathway extending through the holding clamp, the sliding plate, the mounting plate, and the mount to thereby provide access to the shuttle through the golf ball holder.

9. The golf ball holder of claim 8, wherein the holding clamp comprises a cup defining a cavity for receiving the golf ball and a cavity surface in the cavity, wherein an opening into the service pathway is formed in the cavity surface.

10. The golf ball holder of claim 9, wherein the holding clamp comprises a first service through hole, the sliding plate comprises a second service through hole, the mounting plate comprises a third service through hole, and the mount comprises a fourth service through hole.

11. The golf ball holder of claim 10, wherein the first, second, third, and fourth service through holes are aligned in the direction parallel to the axis to form the service pathway.

12. The golf ball holder of claim 11, wherein the service pathway is continuous column of space configured to receive a lubricating tool.

13. A golf ball holder configured to be attached to a shuttle that is configured to be attached to a track for movement of the golf ball holder along the track, wherein the shuttle comprises a lubricated bearing, the golf ball holder comprising:
 a holding clamp configured to receive the golf ball and maintain an orientation of the golf ball and comprising a first service through hole;
 a sliding plate comprising a top surface, a bottom surface, and a second service through hole;
 a mounting plate comprising a top surface, a bottom surface, and a third service through hole;
 a mount comprising a top surface, a bottom surface, and a fourth service through hole, wherein the bottom surface is configured to be mounted to the shuttle; and
 a mounting pin connecting the holding clamp, the sliding plate, the mounting plate, and the mount
 wherein the golf ball holder is configured to be arranged with the holding clamp, sliding plate, mounting plate, and mount stacked in a direction parallel to an axis with the first, second, third, and fourth service through holes aligned to create a service pathway that extends in the direction parallel to the axis.

14. The golf ball holder of claim 13, wherein the mounting plate comprises a surface slot in the bottom surface of the mounting plate and the mount comprises a protrusion on the top surface of the mount, wherein the protrusion fits within the surface slot.

15. The golf ball holder of claim 14, wherein the third service through hole is aligned with the surface slot and the fourth service through hole is aligned with the protrusion.

16. The golf ball holder of claim 13, wherein the holding clamp comprises a cup defining a cavity for receiving the golf ball and a cavity surface in the cavity, wherein an opening into the first service through hole is formed in the cavity surface.

17. The golf ball holder of claim 13, wherein the holding clamp comprises two first service through holes, the sliding plate comprises two second service through holes, the mounting plate comprises two third service through holes, and the mount comprises two fourth service through holes.

* * * * *